(12) United States Patent
Skovgaard et al.

(10) Patent No.: US 7,532,792 B2
(45) Date of Patent: May 12, 2009

(54) OPTICAL COUPLER, A METHOD OF ITS FABRICATION AND USE

(75) Inventors: Peter M. W. Skovgaard, Birkerød (DK); Martin Dybendal Nielsen, Kgs. Lyngby (DK)

(73) Assignee: Crystal Fibre A/S, Birkerod (DK)

( * ) Notice: Subject to any disclaimer, the term of this patent is extended or adjusted under 35 U.S.C. 154(b) by 0 days.

(21) Appl. No.: 11/681,363

(22) Filed: Mar. 2, 2007

(65) Prior Publication Data

US 2008/0050069 A1 Feb. 28, 2008

Related U.S. Application Data

(60) Provisional application No. 60/884,694, filed on Jan. 12, 2007, provisional application No. 60/840,439, filed on Aug. 28, 2006.

(51) Int. Cl.
G02B 6/26 (2006.01)
G02B 6/28 (2006.01)

(52) U.S. Cl. ............................ 385/39; 385/31; 385/43; 385/46; 385/50; 385/24

(58) Field of Classification Search ........................ None
See application file for complete search history.

(56) References Cited

U.S. PATENT DOCUMENTS

| | | | |
|---|---|---|---|
| 4,818,062 A | 4/1989 | Seifres et al. | |
| 5,185,758 A | 2/1993 | Fan et al. | |
| 5,268,978 A | 12/1993 | Po et al. | |
| 5,708,669 A | 1/1998 | DiGiovanni et al. | |
| 5,864,644 A | 1/1999 | DiGiovanni et al. | |
| 5,907,652 A | 5/1999 | DiGiovanni et al. | |

(Continued)

FOREIGN PATENT DOCUMENTS

WO 00/49435 A1 8/2000

(Continued)

OTHER PUBLICATIONS

Birks, T.A., et al., "*Low Power Acousto-Optic Device Based on a Tapered Single-Mode Fiber*", IEEE Photonics Technology Letters, Jun. 1994, pp. 725-727, vol. 6, No. 6, IEEE.

(Continued)

*Primary Examiner*—Omar Rojas
(74) *Attorney, Agent, or Firm*—Buchanan Ingersoll & Rooney PC

(57) ABSTRACT

An optical coupler for coupling light from at least two input fibers into one output fiber and a method of fabricating and use of an optical coupler. The coupler comprises a) an input section comprising an output end face at one end of the bundling-length of input fibers; and b) an output section comprising an output fiber comprising a confining region for confining light propagated in the input fibers and a surrounding cladding region and having an input end face; wherein the output end face of said input section is optically coupled to the input end face of the output section and at least the confining region of the output fiber is tapered down from a first cross sectional area at the input end face to a second, smaller cross sectional area over a tapering-length of the output fiber.

57 Claims, 23 Drawing Sheets

U.S. PATENT DOCUMENTS

| | | |
|---|---|---|
| 5,949,941 A | 9/1999 | DiGiovanni |
| 5,966,480 A | 10/1999 | LeGrange et al. |
| 6,134,362 A | 10/2000 | Au-Yeung et al. |
| 6,324,326 B1 | 11/2001 | Dejneka et al. |
| 6,434,295 B1 | 8/2002 | MacCormack et al. |
| 6,434,302 B1 | 8/2002 | Fidric et al. |
| 6,477,307 B1 | 11/2002 | Tankala et al. |
| 6,512,867 B2 | 1/2003 | Brosnan |
| 6,597,853 B2 | 7/2003 | Cabot et al. |
| 6,608,951 B1 | 8/2003 | Goldberg et al. |
| 6,631,230 B1 | 10/2003 | Campbell |
| 6,687,445 B2 | 2/2004 | Carter et al. |
| 6,704,479 B2 | 3/2004 | Koplow |
| 6,731,837 B2 | 5/2004 | Goldberg et al. |
| 6,751,241 B2 | 6/2004 | Davis et al. |
| 6,778,562 B2 | 8/2004 | Bayart et al. |
| 6,779,364 B2 | 8/2004 | Tankala et al. |
| 6,816,652 B1 | 11/2004 | Lin et al. |
| 6,823,117 B2 | 11/2004 | Vakili et al. |
| 6,882,664 B2 | 4/2005 | Bolshtyansky et al. |
| 6,950,586 B2 | 9/2005 | Po |
| 6,961,497 B2 | 11/2005 | Kim et al. |
| 6,970,624 B2 | 11/2005 | DiGiovanni et al. |
| 6,987,783 B2 * | 1/2006 | Fajardo et al. ................. 372/6 |
| 6,990,278 B2 | 1/2006 | Vakili et al. |
| 7,003,206 B2 | 2/2006 | Tankala et al. |
| 7,010,204 B2 | 3/2006 | Reith et al. |
| 7,016,573 B2 | 3/2006 | Dong et al. |
| 7,046,432 B2 | 5/2006 | Starodoumov |
| 7,046,875 B2 | 5/2006 | Gonthier et al. |
| 2003/0031441 A1 * | 2/2003 | Simons et al. .............. 385/123 |
| 2006/0263024 A1 * | 11/2006 | Dong et al. ................. 385/125 |

FOREIGN PATENT DOCUMENTS

| | | |
|---|---|---|
| WO | 02/088802 A1 | 11/2002 |
| WO | 02/101429 A2 | 12/2002 |
| WO | 03/019257 A1 | 3/2003 |
| WO | 2005/019029 A2 | 9/2005 |

OTHER PUBLICATIONS

Broeng, Jes, Invited Paper, "*Photonic Crystal Fibers: A New Class of Optical Waveguides*", Optical Fiber Technology, 1999, pp. 305-330, vol. 5, Academic Press.

Bjarklev, Anders, et al., "*Fabrication of Photonic Crystal Fibres*", Photonic Crystal Fibres, 2003, pp. 115-130, Chapter 4, Kluwer Academic Publishers, Norwell, MA, USA.

* cited by examiner

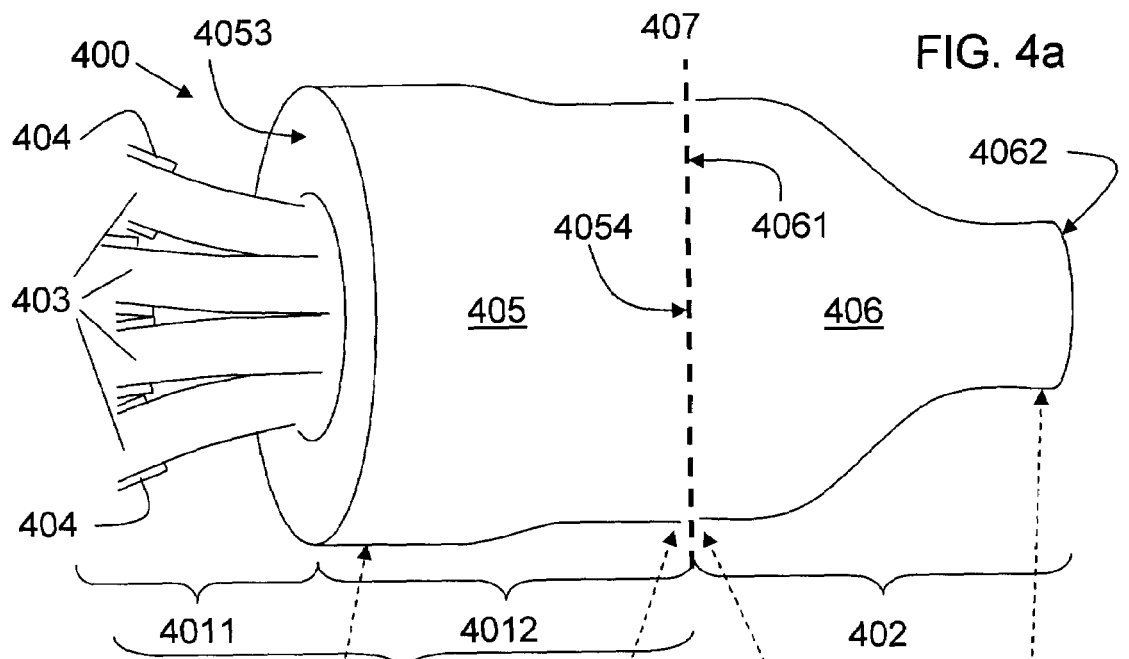
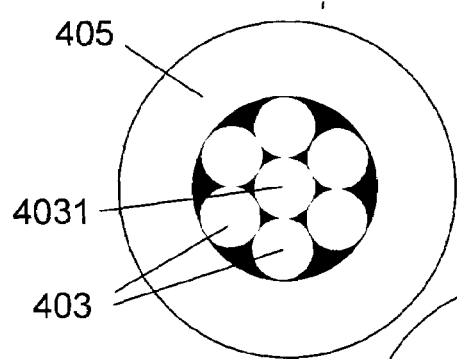
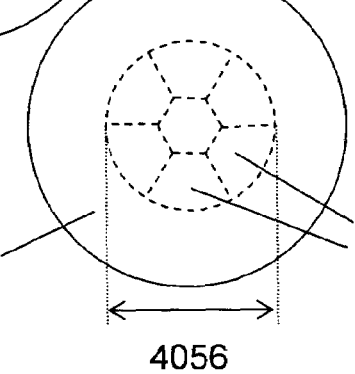
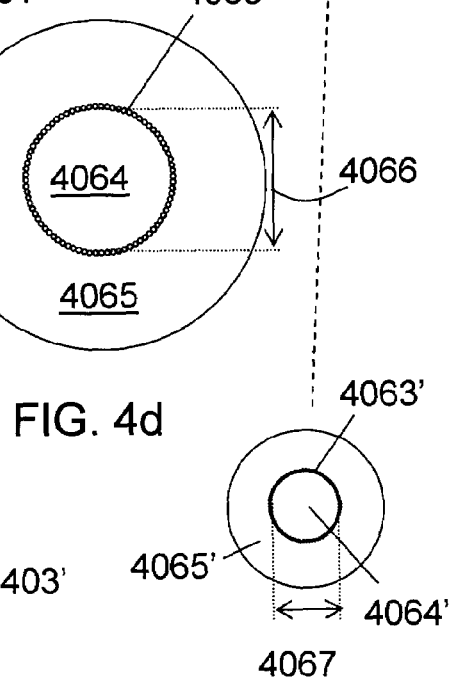
FIG. 4a
FIG. 4b
FIG. 4c
FIG. 4d
FIG. 4e

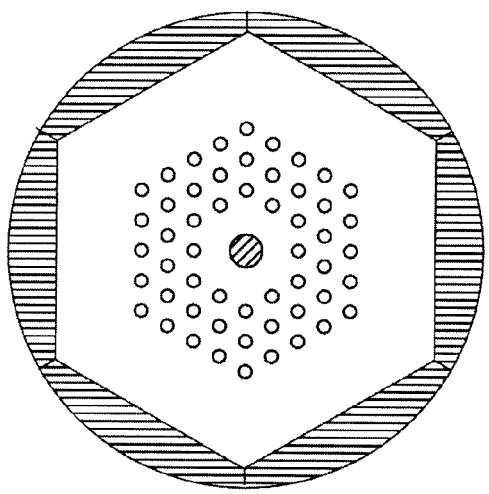
FIG. 10a
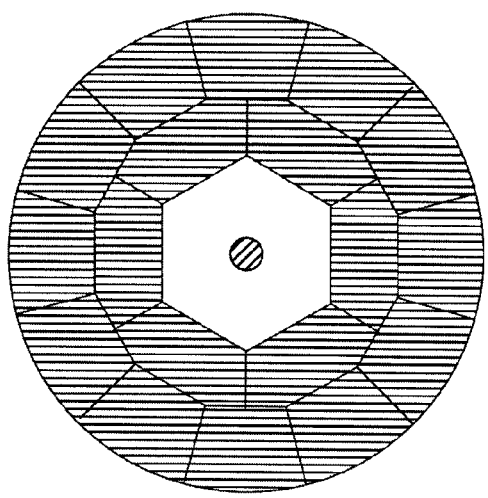
FIG. 10b
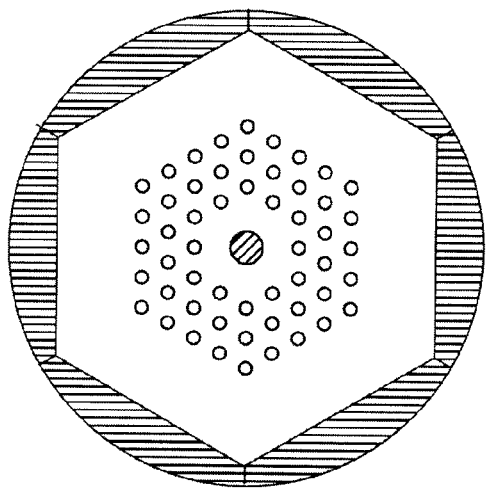
FIG. 10c
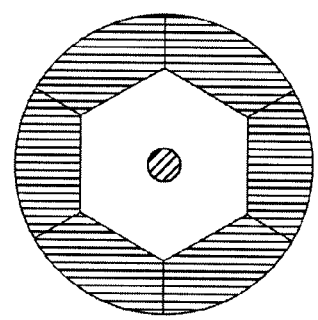
FIG. 10d
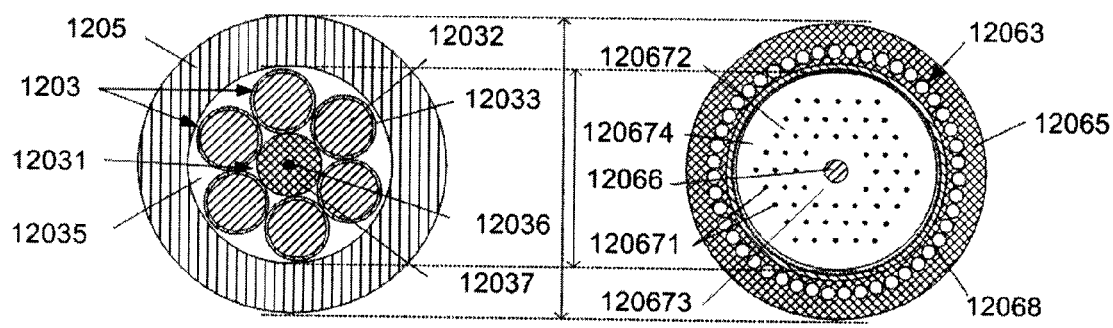
FIG. 12a
FIG. 12b

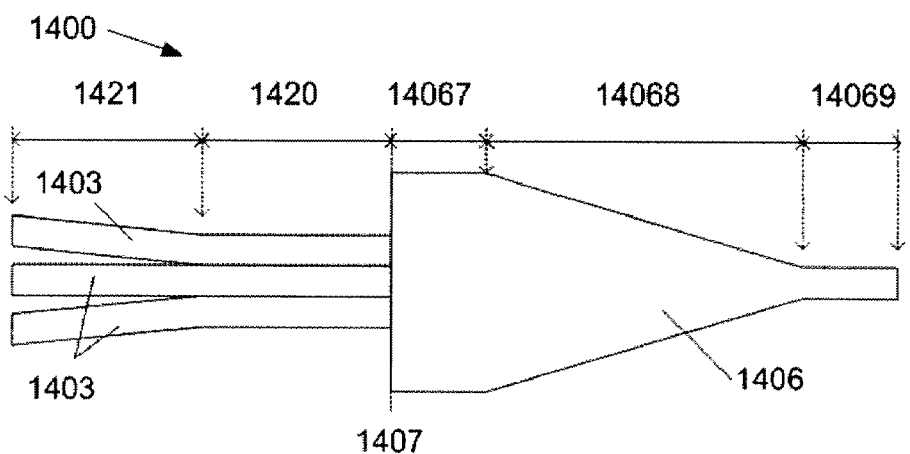
FIG. 14a
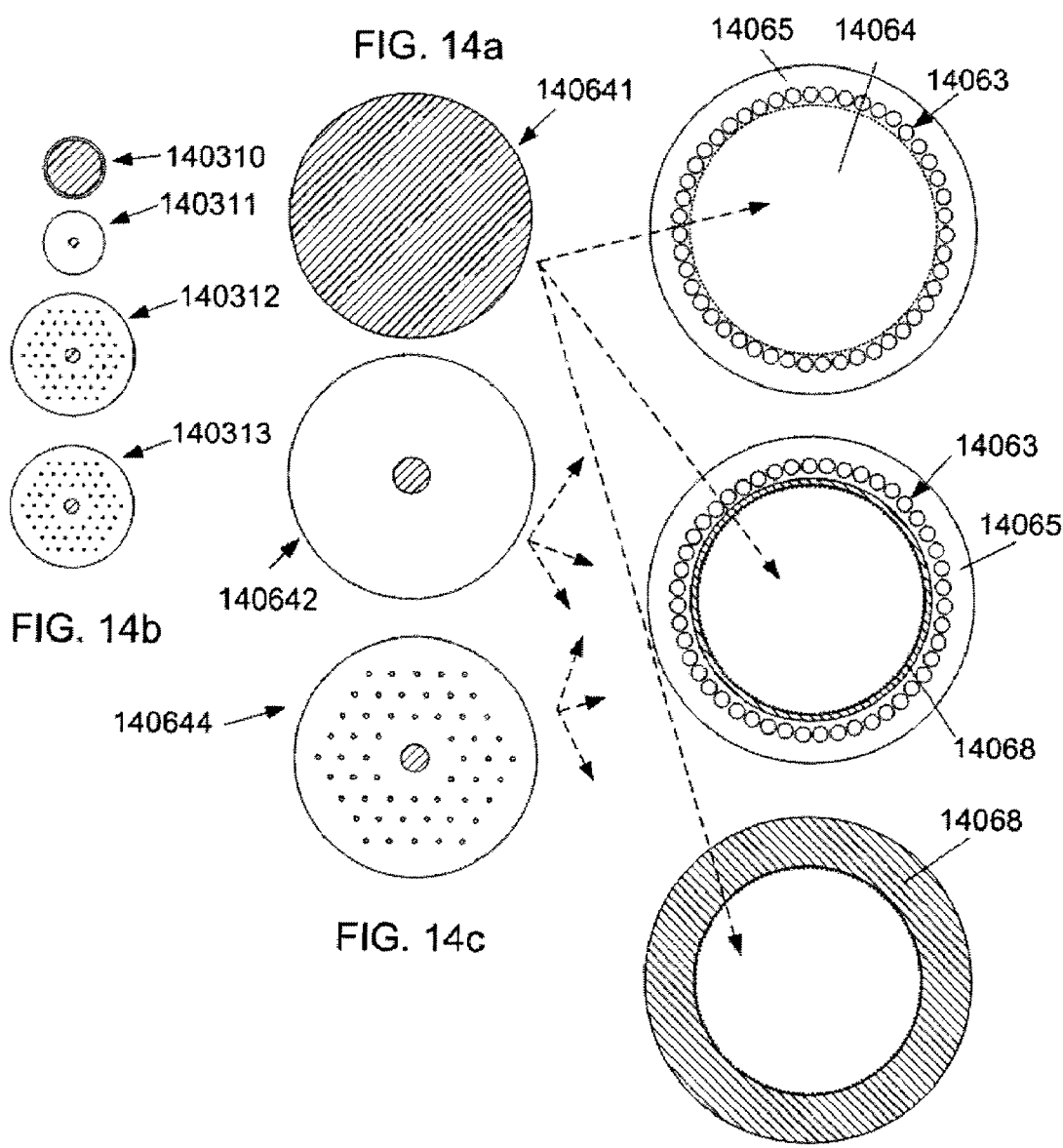
FIG. 14b
FIG. 14c
FIG. 14d

OPTICAL COUPLER, A METHOD OF ITS FABRICATION AND USE

TECHNICAL FIELD

The present invention relates in general to coupling of light between input and output waveguides.

The invention relates specifically to an optical coupler for coupling light from at least two input fibers into one output fiber.

The invention furthermore relates to a method of fabricating an optical coupler for coupling light from at least two input fibers into one output fiber.

The invention furthermore relates to the use of an optical coupler, to an optical coupler obtainable by the method and to an article comprising an optical coupler.

The invention may e.g. be useful in applications such as fiber lasers or amplifiers, where efficient coupling of light from a number of pump sources to a single (e.g. double clad) output fiber is needed. The invention is useful in applications where very high powers (e.g. more than 50 W-100 W) are to be combined from a multitude of individual input fibers into one output fiber. It is further useful in applications where signal feed through is needed.

BACKGROUND ART

U.S. Pat. No. 5,864,644 deals with an optical coupler comprising a tapered fiber bundle optically coupled (e.g. spliced) to a length of cladding pumped fiber, the bundle comprising a plurality of multimode fibers and optionally a single mode fiber bundled together, the bundle being tapered to a reduced cross sectional region, and the reduced cross sectional region fusion spliced to the cladding pumped fiber. The optical coupler of U.S. Pat. No. 5,864,644 is difficult to handle without introducing impurities to the surfaces of the component which may cause problems in-high power applications.

U.S. Pat. No. 6,778,562 deals with a coupler for a multi-mode pump comprising a photonic crystal fiber with a stretched portion and at least one multimode fiber coupled thereto. A disadvantage of this coupler is that the mode field diameter of a signal fiber is smaller at the relatively smaller cross sectional end (the down-tapered end) of the tapered fiber than at the relatively larger cross-sectional end (the un-tapered end). The coupler has the same disadvantages as mentioned above regarding handling and impurities.

WO-2005/091029 deals with an optical coupler for coupling light from a plurality of input fibers into one output fiber, wherein the bundled input fibers over a part of their length are surrounded by a tube comprising an annular arrangement of holes, wherein the input fibers and the tube are fused together and tapered, whereby the down tapered end of the coupler forms an air-clad output fiber. The optical coupler of WO-2005/091029 is relatively complex to manufacture, because special care must be taken to avoid the inclusion of impurities and/or air bubbles between the input fibers and the surrounding tube during fusing and tapering.

OBJECTS AND SUMMARY

A problem of the prior art lies in the manufacturing process, specifically in the introduction of impurities during manufacture of an optical coupler, which may degrade performance, especially in high-power applications.

An object of the present invention is to provide an optical coupler, which is relatively easy to manufacture. It is another object of the invention to provide an optical coupler that is relatively easy to handle. It is a further object to provide an optical coupler that can give a relatively high-power output. It is a further object to provide an optical coupler that can yield a single mode signal feed through with improved control of the mode field diameter.

An object of the invention is achieved by an optical coupler for coupling light from at least two input fibers into one output fiber, the optical coupler comprising a) an input section comprising at least two input fibers, which are bundled over a bundling-length and having an output end face at one end of the bundling-length; and b) an output section comprising an output fiber comprising a confining region for confining light propagated in said input fibers and a surrounding cladding region and having an input end face;

wherein said output end face of said input section is optically coupled to said input end face of said output section and at least said confining region of said output fiber is tapered down from a first cross sectional area at said input end face to a second, smaller cross sectional area over a tapering-length of said output fiber.

An advantage is that the output section comprises an optical fiber which can be made in appropriate lengths and which can be easily tapered. It is an advantage that the component is made in two separate functional units. It is an advantage that the tapering of the input fiber bundle can be dispensed with. The output fiber can be made on a fiber drawing tower in long lengths with excellent production reproducibility. The tapering can either be done during fabrication of the output fiber or after its fabrication (e.g. by heating and stretching). The tapering of micro-structured and standard (non-micro-structured) optical fibers are e.g. described in, respectively, WO 00/49435 and T. A. Birks, P. St. J. Russell, C. N. Pannell, "Low Power Acousto-Optic Device Based on a tapered Single-Mode Fiber", IEEE Photonics Technology Letters, Vol. 6, No. 6, June 1994, p. 725-727.

The term 'fiber' is in the present context taken to mean an optical waveguide for guiding light. Although, typically, input waveguides are optical fibers having an outer cross-sectional diameter of the order of hundreds of $\mu m$ (e.g. ~80, ~125 $\mu m$ or ~200 $\mu m$ or ~400 $\mu m$), larger dimensions may be appropriate, e.g. in the mm-range. The latter is especially true for the un-tapered part of the output fiber. Likewise, although the input and output fibers can have a circular outer cross-sectional form, deviations from such form can occur depending on the application (cf. e.g. FIG. 10 wherein the central input fiber has a hexagonal outer cross-sectional form and the surrounding input fibers have an elongate outer cross-sectional form).

A further advantage of embodiments of the invention is that the light in the tapered output section will never reach a surface or an interface that can have contamination due to handling. The light is always guided inside the element, either by Total Internal Reflection (TIR) due to index differences between homogenous materials or by confinement by micro-structural elements (e.g. solid elements or holes).

In an embodiment, the confining region is tapered down, but the outer dimension of the output section is NOT tapered down (if e.g. more cladding material is applied to the down-tapered confining region than to the un-tapered part of the confining region).

In an embodiment, the output fiber (including the confining region and a surrounding cladding region) is tapered down.

For optical fibers according to embodiments of the present invention, the most important optical wavelengths are in the ultra-violet to infrared regime (e.g. wavelengths from approximately 150 nm to 11 μm). In this wavelength range the refractive index of most relevant materials for fiber production (e.g. silica) may be considered mainly wavelength independent, or at least not strongly wavelength dependent. However, for non-homogeneous materials, such as fibers comprising micro-structural elements, e.g. voids or air holes, the effective refractive index may be very dependent on the morphology of the material. Furthermore, the effective refractive index of such a fiber may be strongly wavelength dependent. The procedure of determining the effective refractive index at a given wavelength of a given fiber structure having voids or holes is well-known to those skilled in the art (see e.g. Broeng et al, Optical Fiber Technology, Vol. 5, pp. 305-330, 1999).

In preferred embodiments, the input and output optical fibers of the optical coupler are adapted to propagate optical wavelengths selected from the range from 250 nm to 3.6 μm, such as from the range from 850 nm to 1800 nm, such as from the range from 900 nm to 1100, such as from the range from 1300 nm to 1700 nm.

The terms the fiber or waveguide being 'adapted to propagate light' or 'adapted to guide light' at a specific wavelength are in the present context taken to mean that light at that wavelength can be guided or propagated in the waveguide in question from one end of the waveguide to the other. In an embodiment, light at a wavelength guided by the waveguide is taken to mean that at least 1% of the optical energy entering the input end of the fiber is propagated to the output end of the fiber, such as at least 50%, such as at least 90%, at least 99%. In an embodiment, light at a wavelength guided by the waveguide is taken to mean that the attenuation of light at that wavelength is less than 40 db/km, such as less than 30 dB/km, such as less than 20 db/km, such as less than 10 db/km, such as less than 5 db/km. Preferably the numerical aperture (NA) at the interface of a fiber receiving light from a previous waveguide is comparable but at least as large as that of the previous section, e.g. so that NA(input fiber)≧NA (pump delivery fiber), the pump delivery fiber being e.g. an optical fiber coupled to a laser diode.

In an embodiment, the output fiber is a micro-structured optical fiber.

In an embodiment, the micro-structured optical fiber comprises solid micro-structured elements at least over a length including said input end face (e.g. low-index micro-structured elements in a background material having a higher refractive index than the low-index elements).

In an embodiment, the output fiber comprises an air-cladding surrounding a confining region, at least over a part of its longitudinal extension. An air-cladding is taken to mean at least one ring of closely spaced air holes adapted to confine light within the ring, e.g. confining light to an inner (e.g. multimode) cladding of a multi-clad fiber. Fibers with air-cladding and their fabrication are e.g. described in U.S. Pat. No. 5,907,652 and WO 03/019257.

The Numerical Aperture (NA) of the light increases over the tapering region of the output section. The holes of an air-cladding can ensure optical guidance, even up to NAs of 0.6 or higher (e.g. ≧0.8).

In an embodiment, the tapering length of the output fiber is adapted to provide low loss propagation by making a smooth, gradual, preferably adiabatic taper. In an embodiment, the tapering length of the output fiber is at least 1 mm, such as at least 2 mm, such as at least 5 mm, such as at least 10 mm, such as at least 50 mm. In an embodiment, the tapering profile (i.e. the curve defined by the outer dimension of the tapered region in a longitudinal cross section) is continuous (i.e. contains no steps). In an embodiment, the tapering profile is differentiable, at least in the down-tapered end of the profile. In an embodiment, the tapering profile is parabolic. In general the appropriate tapering length of an output fiber containing a single mode region is longer than the tapering length of an output fiber containing only pump light.

In an embodiment, a maximum cross-sectional dimension (e.g. a diameter) of the output fiber (or of the confining region of the output fiber) is tapered down a factor of at least 1.2, such as at least 2, such as at least a factor of 2.5, such as at least a factor of 3, such as at least a factor of 3.5, such as at least a factor of 4, 5 or 6 over the tapering length.

In an embodiment, the output fiber is a multi-cladding fiber. In an embodiment, the output fiber comprises an inner cladding region surrounding a core region and an air-cladding surrounding the inner cladding region. In an embodiment, the output fiber comprises a signal core adapted to guide light at a signal wavelength and a first cladding region adapted to guide pump light at a pump wavelength. In an embodiment, the inner cladding region of the output fiber comprises micro-structural elements (cf. e.g. WO 03/019257).

In an embodiment, the output fiber comprises a low-index cladding region surrounding a confining region, the confining region e.g. comprising a high-index core region and an inner cladding region (e.g. optionally comprising solid or void micro-structural elements, e.g. adapted to guide pump light) between the core region and the low-index cladding region, where the inner (intermediate) cladding region has a refractive index (or effective refractive index) between that of the core region and that of the low-index cladding region. In an embodiment, the inner cladding region comprises a background material and the low-index cladding region surrounding the inner cladding region comprises a down-doped ring (e.g. a ring of silica background material doped with an index-lowering material, e.g. F).

In an embodiment, the output fiber comprises an outer air-cladding surrounding the low-index cladding region (and a possible inner cladding region). In an embodiment, a low-index cladding material surrounds the holes of the air-cladding, so that if air-holes collapse over a length of the output fiber due to heating, an 'inner' region of the low-index material is maintained. Such an arrangement can e.g. be obtained by making a preform wherein the elements for forming the air-clad region comprise capillaries comprising a low-index material.

In an embodiment, the output fiber comprises a region that is multimode at a wavelength propagated by the optical coupler. In an embodiment, the core region of the output fiber is multimode at a propagating wavelength λ. The term 'multimode' is in the present context taken to mean 'able to support propagation of more than one bound transversal mode at the wavelength in question'.

In the output section, the glass material inside the (possibly multimode) core region can have a higher refractive index (or effective refractive index) than that of a low-index cladding region surrounding the core (and possible inner cladding region(s) that may also be adapted to guide light, e.g. pump light). In such a case, the (possibly fusion) splicing of the output section to the input section of the optical coupler can be performed at very high temperatures, such that the glass interface between the input section and the output section can be made with good mechanical strength and with good optical transmission. When splicing at such high temperatures, the holes of a possible air-cladding will typically suffer in the heating region (i.e. decrease in cross-sectional area or fully collapse), unless pressurized. This will have no or little negative effect on the optical coupling, however, because the inner cladding material will show optical guidance by itself, even without the holes. The low optical loss and the high mechanical strength, makes such a high temperature (fusion) splice appropriate for high-power applications. The term 'high-power' is in the present context taken to mean optical power (handled by the optical coupler) larger than 50 W, such as larger than 100 W, such as larger than 500 W such as larger than 1 kW.

In an embodiment, the output fiber is a non-micro-structured optical fiber. In an embodiment, the non-micro-structured optical fiber comprises a low-index outer cladding, e.g. a polymer cladding for confining light to the confining region of the output fiber.

In an embodiment, the output fiber is a single material (preferably silica) fiber. In an embodiment, regions of the fiber are doped with index-modifying elements (e.g. Ge, F, B, P, etc.) to either up- or down-dope the region in question to provide a specific function of the region in the output fiber.

The input and output fibers are preferably silica based. Alternatively, other host materials may be used, e.g. fluoride (e.g. fluorozirconate), tellurite, phosphate or chalcogenide based glasses. Alternatively, fully or partially polymer based optical fibers may be used.

In an embodiment, the output fiber comprises polarization maintaining elements (e.g. stress elements) to provide that the polarization state of the signal in a signal waveguide in the output fiber is maintained.

In an embodiment, the output section consists of the output fiber.

In an embodiment, the input section comprises an input fiber enclosure with a longitudinal extension, which encloses the input fibers at least over a part of the bundling-length. Alternatively, the input fibers can be held together over a bundling-length by any other appropriate means, e.g. by an adhesive, by discrete annular elements, etc., or by fusing.

In an embodiment, un-tapered input fibers are bundled over a bundling-length and fused together over a fusing-length. It is intended that the fusing is only carried out to hold the un-tapered bundle of input fibers together over the fusing-length and to fully or partially remove interstitial volume between the input fibers and the surrounding surface of an optional enclosure. It is intended that the input fibers are NOT substantially tapered by the fusing process.

In an embodiment, the input fibers are bundled to form parallel paths (i.e. so that their central axes are parallel over the bundling length). Alternatively, at least some of the input fibers can be helically wound around a central input fiber at least over apart of the bundling length. This may form a more stable construction and contribute to holding the bundle together.

In an embodiment, the input fiber enclosure has an end face forming part of the output end face of the input section.

In an embodiment, the input fiber enclosure is a glass tube. In an embodiment, the enclosure comprises silica glass. A functional task of the enclosure is to mechanically enclose and fix the bundle of input fibers over a specific length. Another task is to make it possible to apply vacuum to the bundle (which helps to ensure mechanical/physical contact between the bundled fibers themselves and the inner wall of the enclosure at any point. Further, it provides mechanical stability after the fusing and can be used to adapt the outer dimension of the input section to that of the output section/fiber. Alternatively or additionally, it can form a cladding for the input fiber bundle over its fusing length.

In an embodiment, the input fiber enclosure has a length of at least 1 mm, such as at least 2 mm, such as at least 5 mm, such as at least 10 mm, such as at least 10 mm 40 mm. In practice, the minimum length is limited by the handling during fusing (by the size of mechanical fixtures, etc.) and will often be subsequently adapted to the particular application, e.g. by cleaving.

In an embodiment, the input section comprises a first input sub-section comprising first lengths of the at least two input fibers (e.g. in loosely assembled form) and a second input sub-section comprising second lengths of the at least two input fibers, which are bundled over a bundling-length.

In an embodiment, the input fibers are fused together over a fusing length of their longitudinal extension comprising at least a part of the bundling-length including said output end face of said input section. In an embodiment, the fusing length is smaller than the bundling-length. The fusing length is optimized from application to application. In general, short fusing lengths and fusing temperatures as low as possible (to achieve the desired effect), possibly in a multi-step process, are recommended.

In an embodiment, the fusing length is smaller than the length of the enclosure. If appropriate, however, the fusing length may be larger than or equal to the length of the enclosure.

In an embodiment, the at least two input fibers and the input fiber enclosure are fused together over at least a part the length of the enclosure including the output end face of the input section.

In an embodiment, each of the at least two input fibers comprise a core region for propagating light at a wavelength $\lambda$ and a cladding region. In an embodiment, the core and cladding regions are adapted to substantially confine light to the core region. In an embodiment, the core and cladding regions are adapted to ensure that a majority of the light energy propagated by an input fiber is confined to the core region, such as 75% of the energy, such as 90%, such as 99% of the energy.

In an embodiment, at least some of the input fibers are adapted to propagate different wavelengths, e.g. so that a given input fiber can propagate several wavelengths.

In an embodiment, light in the second input sub-section (comprising lengths of bundled non-micro-structured, standard multimode fibers in an enclosure) is guided by Total Internal Reflection, where the cladding has an index lower than the core. Typically the Numerical Aperture of the input fibers is in the range from 0.15 to 0.22, although other values may be relevant. At all points along the length of the second input sub-section, the light never reaches any outer surface or interface. This means that any contamination or disturbance of the fiber surface during production will have no detrimental effect on the light transmission, even at high optical powers.

In an embodiment, the at least two input fibers comprise core regions for carrying light to be optically coupled to the confining region of the output fiber.

In an embodiment, the core regions of the input fibers at the output face of the input section are aligned with the confining region of the output fiber at the input face of the output section to minimize optical loss at their interface. In other words, in a transversal cross section of the optical component perpendicular to a direction of propagation of light in the component, the regions of the input fibers carrying light to be propagated to the output fiber are advantageously aligned with the confining region of the output fiber at their common interface.

In an embodiment, the input fiber bundle comprises one or more standard, non-micro-structured, optical fibers.

In an embodiment, at least one of the input fibers is a multimode fiber. In an embodiment, a majority, such as all of the input fibers are multimode fibers at a propagating wavelength.

In an embodiment, at least one of the input fibers is a single mode fiber.

In an embodiment, the at least two input fibers comprise a signal fiber, which is adapted to guide light at a signal wavelength (e.g. in a single transversal mode) and one or more pump fibers adapted to guide light at a pump wavelength or at several pump wavelengths. In an embodiment, the input signal fiber is centrally located. Alternatively, it can be off-centered.

In an embodiment, the central fiber of the fiber bundle can be a single mode (SM) fiber carrying an optical signal. Since no tapering of bundled input fibers takes place in the optional fusing process in the second input sub-section, the fusing will have no effect on the modal properties of such a central SM core (e.g. the cut-off and Mode Field Diameter (MFD) remains the same). If the fiber for the tapered output section is designed such that it also includes a SM core in an inner cladding, signal feed-through with a controlled MFD can be made. The fiber for the tapered output section should advantageously be designed and produced such that the optical performance of the SM waveguide is satisfactory in the un-tapered region, the tapered region as well as in the parallel down-tapered region of the output section of the optical coupler.

In an embodiment, at least one of the input fibers is a micro-structured fiber. In an embodiment, the micro-structured fiber is centrally located and adapted to guide signal light at a signal wavelength and is surrounded by one or more pump fibers adapted to guide light at a pump wavelength.

In an embodiment, the micro-structured input fiber comprises a high index core region surrounded by a cladding region comprising a solid (possibly fully or partially index-depressed) first cladding region surrounding the core region and a second cladding region surrounding the first cladding region and comprising an arrangement of (solid or void) micro-structural elements (cf. e.g. WO 2005/091029, FIGS. 22-29 and pp. 50-58).

Typically an optical fiber comprises an outer coating (e.g. a polymer coating) intended for mechanically protecting the fiber during handling or operation. In an embodiment, at least one of the input fibers is un-coated over at least a part of the bundling-length. In an embodiment, a majority or all of the input fibers are un-coated over at least a part of the bundling-length (including the fusing length). In an embodiment, at least one, such as a majority or all of the input fibers is/are un-coated over at least a part of the longitudinal extension of the input fiber enclosure. If the input fibers comprise a mechanical coating, e.g. a polymer coating, it is advantageously removed before any heating of the input fiber bundle at elevated temperatures, e.g. in connection with fusing the bundle together. Otherwise, impurities from the coating may decrease the amount of power carried by the coupler.

In an embodiment, the input fiber bundle comprises at least 2 fibers, such as at least 3, such as at least 5, such as at least 7, such as at least 15, such as more than 24, such as more than 40.

In an embodiment, the input fiber bundle comprises a centrally located input fiber surrounded by a number of other input fibers. In an embodiment, the surrounding (other) input fibers are located along the periphery of the centrally located optical fiber. In an embodiment, the outer surface of the surrounding fibers touch the outer surface of the central optical fiber over a part of their longitudinal extension. In an embodiment, the outer diameter (or largest outer cross-sectional dimension) of a surrounding optical fiber is smaller than the corresponding dimension of the central optical fiber. In an embodiment, the outer diameter (or largest outer cross-sectional dimension) of the surrounding optical fibers is equal for all surrounding optical fibers. Alternatively, the outer diameter (or largest outer cross-sectional dimension) of the surrounding optical fibers may be different for some of the fibers. In an embodiment, the number of surrounding optical fibers is 2 or 3 or larger than or equal to 4, such as larger than or equal to 6, such as larger than or equal to 8, such as in the range from 10 to 24, such as larger than or equal to 12, such as larger than or equal to 20, such as larger than or equal to 40, such as larger than or equal to 80. In an embodiment, the number of surrounding optical fibers surrounding the central optical fiber is larger than the maximum number of surrounding fibers being able to all contact the outer periphery of the central optical fiber. In an embodiment, the surrounding optical fibers are located around the central optical fiber in one or more layers (e.g. in 2 or 3 layers). In an embodiment, the outer diameter (or largest outer cross-sectional dimension) of the surrounding optical fibers are different from layer to layer of the second optical fibers. In an embodiment, the numerical aperture of the surrounding optical fibers at the output end face is different from layer to layer.

In an embodiment, the cross-sectional form and dimensions of a curve enclosing the outer boundary of the input fiber bundle at the output end face of the input section and the cross-sectional form and dimensions of the confining region of the output fiber at the input end face are adapted to minimize loss in the optical coupling between the input section and the output section. In an embodiment, less than 2 dB of the optical power, such as less than 1 dB, such as less than 0.5 dB, such as less than 0.2 dB, such as less than 0.1 dB is lost in the transition from the input section to the output section.

In an embodiment, the cross-sectional form of the curve enclosing the outer boundary of the input fiber bundle is substantially circular. Alternatively, the cross sectional form may be of any other kind adapted to the application in question, such as polygonal (e.g. hexagonal or rectangular) or elongate (e.g. elliptical).

In an embodiment, the cross-sectional dimensions at the input end face of the output fiber of the region of the output fiber intended for propagating the light from the input fiber bundle, the confining region, (e.g. the region within an annular air-cladding or any other confining entity) are substantially equal to but in practice larger than or equal to the cross-sectional dimensions of a curve enclosing the outer boundary of the input fiber bundle at the output end face of the input section. In practice minimum 'oversize' of the cross-sectional dimensions of the confining region of the output fiber is determined by the production and handling tolerances (incl. alignment).

In an embodiment, the input section and the output section are adapted to provide that signal light from an input signal fiber is propagated in a signal core of the output fiber.

In an embodiment, the outer geometries of the input and output sections are adapted to substantially match each other at their common interface.

In an embodiment, a sleeve is applied over at least a part of the longitudinal extension of the optical coupler and at least covering the mutually optically coupled end faces of the input and output sections. In an embodiment, the sleeve is a purely mechanically protective jacket.

It is intended that the individual features of the input and output sections can be freely combined according to the actual application and requirements.

The invention further relates to a method of fabricating an optical coupler for coupling light from at least two input fibers into one output fiber, the method comprising a) providing lengths of said at least two input fibers;

b) providing that said at least two input fibers are bundled over a bundling-length-part of their length, and having an output end face at one end of the bundling-length, and forming part of an input section;

c) providing an output section comprising an output fiber comprising a confining region for confining light propagated in said input fibers and a surrounding cladding region and having an input end face;

d) providing that said output end face of said input section is optically coupled to said input end face of said output section; and f) providing that at least said confining region of said output fiber is tapered down from a first cross sectional area at said input end face to a second, smaller cross sectional area over a tapering-length of said output fiber. The method has the same advantages as indicated above for the optical coupler.

In an embodiment, the confining region of the output fiber is tapered down and an outer 'low-index' cladding is applied to the confining region after the tapering. In an embodiment, at least a part of or all of the surrounding cladding region is applied after the tapering of the confining region.

In an embodiment, the output fiber (including the confining region and a surrounding cladding region) is tapered down.

In an embodiment, the method provides that the input section has an input fiber enclosure with a longitudinal extension, which encloses the input fibers at least over a part of the bundling-length.

In an embodiment, the input fiber enclosure is provided with an end face forming part of the output end face of the input section.

In an embodiment, the method provides that the output fiber comprises an air-cladding for confining light surrounding the confining region at least over part of its longitudinal extension.

In an embodiment, the method provides that the output fiber comprises a low-index cladding region surrounding the confining region.

In an embodiment, the method provides that the low-index cladding region comprises Fluor.

In an embodiment, the method provides that the low-index cladding region comprises a polymer.

In an embodiment, the method provides that an air cladding surrounds the low-index cladding region.

In an embodiment, the method provides that each of the at least two input fibers comprise a core region for propagating light at a wavelength ë and a cladding region.

In an embodiment, the method provides that the core regions of the input fibers at the output face of the input section are aligned with the confining region of the output fiber at the input face of the output section to minimize optical loss at their interface. In an embodiment, the input and output sections are aligned by geometrical or active alignment or a combination.

In an embodiment, the method provides that the input fibers are fused together over a fusing length of their longitudinal extension comprising at least a part of the bundling-length.

In an embodiment, the method provides that the input fiber bundle and the input fiber enclosure are fused together over at least a part of the length of the input fiber enclosure including the output end face of the input section.

In an embodiment, the method provides that the bundled input fibers are cleaved to form the output end face of the input section. In an embodiment, the method provides that the bundled and enclosed input fibers are cleaved to form the output end face of the input section.

In an embodiment, the method provides that the output fiber is made by a stack and draw method or by an extrusion method, cf. e.g. Bjarklev, Broeng, and Bjarklev in "Photonic crystal fibers", Kluwer Academic Press, 2003, chapter IV, pp. 115-130.

In an embodiment, the method provides that the end faces of the input and output sections are adapted to provide a relatively low-loss optical coupling between the input and output sections.

In an embodiment, the method provides that the end faces of the input and output sections are substantially plane.

In an embodiment, the method provides that the outer geometries of the input and output sections are adapted to substantially match each other.

In an embodiment, the method provides that the input section is spliced (e.g. fusion spliced) to the output section.

It is intended that the features of the method be combined with the corresponding optical coupler and vice versa, where appropriate.

The disclosure further relates to the use of an optical coupler as described above and in the section 'Mode(s) for carrying out the invention' below. The use has the same advantages as indicated above for the optical coupler. In an embodiment, the optical coupler is used in an optical amplifier or in a laser configuration.

The disclosure further relates to an optical coupler obtainable by the method as described above and in the section 'Mode(s) for carrying out the invention' below. The optical coupler manufactured by the method has the same advantages as indicated above for the optical coupler.

The disclosure further relates to an article comprising an optical coupler as described above and in the section 'Mode(s) for carrying out the invention' below. The article may e.g. be a laser or an amplifier. The optical coupler may e.g. be configured to provide pump light to an optical fiber laser. In such case the input fibers may consist of a number of pump fibers whose optical power is confined in the output fiber, which may be coupled to an optical fiber (e.g. a double cladding fiber, e.g. comprising an outer air cladding for confining the pump light from the optical coupler) comprising an optically active medium and one or more reflecting elements forming a laser cavity. Alternatively, the optical coupler may e.g. be configured to provide a (e.g. centrally located) signal waveguide fed through the optical coupler with surrounding optical pump light, which may be coupled to an optical amplifying fiber comprising an optically active medium (e.g. a double cladding fiber, e.g. comprising an outer air cladding for confining the pump light and the signal light from the optical coupler, and comprising a centrally located signal core (for receiving signal light from the optical coupler) and an inner cladding having the function of a pump core (for receiving pump light from the optical coupler)).

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which:

FIG. 4 shows an optical coupler according to an embodiment of the invention, FIG. 4a showing a longitudinal perspective view and FIGS. 4b-4e showing transversal views along the length of the coupler;

FIG. 10 shows two sets of comparisons of cross-sectional views of input sections of an optical coupler according to an embodiment of the invention;

FIG. 12 shows cross-sectional views of, respectively, an (un-fused) input section (FIG. 12 a) and of an output section (FIG. 12b);

FIG. 14 shows a two-section optical coupler according to an embodiment of the invention (FIG. 14a) and examples of cross-sectional views of possible input fibers (FIG. 14b) and output fibers (FIG. 14c in combination with 14d)

FIG. 20 shows a thermal image overlaid with a normal photograph showing the temperature of a 19X1 combiner operating with ~170 W transmitted through.

Figure 1:
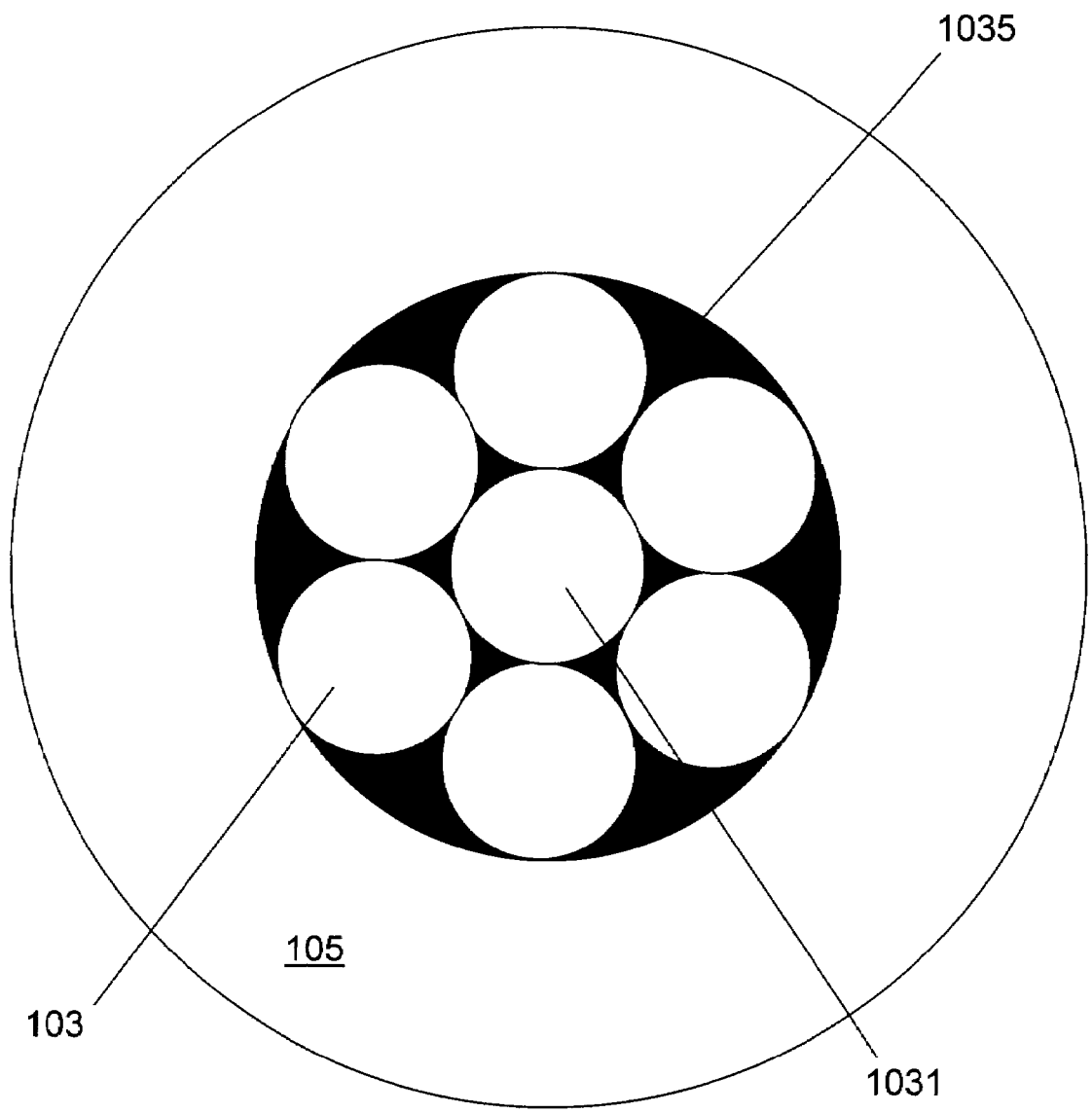
FIG. 1 shows a perspective view of a second input sub-section of an optical coupler according to an embodiment of the invention illustrating the arrangement of input fibers in a cladding tube.

The figures are schematic and simplified for clarity, and they just show details which are essential to the understanding of the invention, while other details are left out. Throughout, the same reference numerals are used for identical or corresponding parts, except that a preceding numeral indicating the figure number in question is used, though, so that e.g. an input fiber is indicated as 103 on FIG. 1 and 203 on FIG. 2, etc.

Further scope of applicability will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Optical couplers used as high-power pump and signal combiners are preferably designed with a view to one or more of the following features:

Low level of contamination: If the combiner consists of regions, where there is spatial overlap between light and material interfaces, there is an increased risk of deterioration or destruction due to absorption of light.

High optical transmission: All optical losses are preferably kept low. At high powers even low levels of transmission losses can lead to significant thermal problems and pose a threat for the reliability of the combiner.

Large Mode Field Diameters (MFD) for the (e.g. Single Mode (SM)) signal: The MFD is preferably kept large at all stages through the combiner element to avoid non-linear effects and catastrophic material damage due to high optical intensities. When the combiner is used on the input of an amplifier, a good MFD-match to the active fiber is preferable.

FIG. 1 shows a perspective view of a second input sub-section of an optical coupler illustrating the arrangement of input fibers in a cladding tube. A number of input fibers 103 (here 7) are shown bundled in a close packed configuration and enclosed by a tubular enclosure 105 in the form of a glass tube with circular inner and outer cross-sections. The arrangement of input fibers shown has a centrally located input fiber 1031 surrounded by 6 further input fibers. Other configurations and other numbers cross-sectional forms and dimensions of fibers may be used depending on the application in question. The centrally located fiber 1031 may e.g. be a signal fiber adapted for propagating light comprising a signal wavelength $\lambda_s$ (e.g. adapted to propagate the signal wavelength $\lambda_s$ in a single mode). The centrally located fiber 1031 may e.g. be a non-micro-structured optical fiber comprising a core region surrounded by a cladding region or a micro-structured optical fiber comprising a core region surrounded by a micro-structured cladding region. The surrounding fibers may e.g. be adapted to propagate light at the same wavelength as the central input fiber (and e.g. all be single mode or all be multimode at $\lambda_s$) or at other wavelengths (either individually different wavelengths or identical). The surrounding fibers may e.g. be adapted to be multimoded at the respective propagating wavelengths. The surrounding fibers may e.g. be pump fibers adapted for propagating a pump wavelength $\lambda_p$ different from the signal wavelength $\lambda_s$. Such a configuration may be used for an article implementing a fiber amplifier. In the cross section shown, the input fibers are bundled and closely packed inside the enclosing tube, but they have NOT been fused as indicated by the (black) space 1035 (indicating voids) between the input fibers 103, 1031 and the inner wall of the surrounding tube 105.

Figure 2:
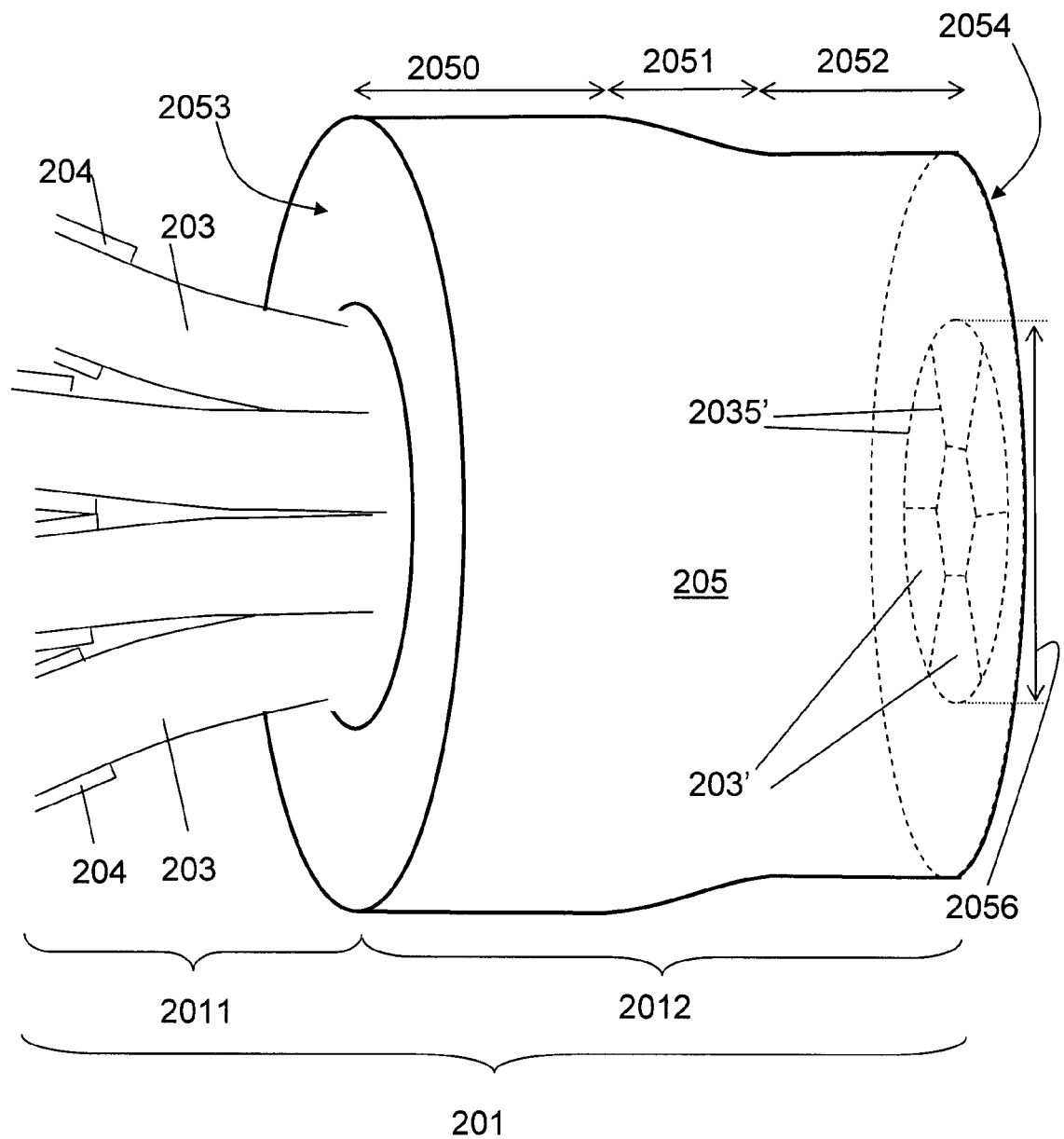
FIG. 2 shows first and second input sub-sections of an optical coupler according to an embodiment of the invention including an un-bundled first input sub-section and an enclosed and partially fused second input sub-section.

FIG. 2 shows first and second input sub-sections of an optical coupler including an un-bundled first input sub-section and an enclosed and partially fused second input sub-section. The input section 201 of the optical coupler comprises a first input sub-section 2011 comprising loosely assembled optical input fibers 203 and a second input sub-section 2012, where the input fibers 203 are bundled and enclosed by an enclosure 205, here a glass tube. The input fibers comprise at least a core region and a cladding region surrounding the core region, where the input fibers are adapted to substantially confine light propagated by the fibers to the core region. It is foreseen that the input fibers have distant ends that are not shown (in a direction to the left in the drawing). Such distant ends will typically be optically coupled to light sources (e.g. laser diodes) for launching light to be propagated into the input fibers. The length of the loosely assembled ends of the first input section 2011 can have any size. The actual length will be determined by practical issues and vary from application to application. Typically, the length of the input fibers of the first input section of the optical coupler will be between 0.1 m and 10 m. The second input sub-section 2012 comprises in the shown embodiment three distinctive first, second and third parts 2050, 2051 and 2052. In the first part 2050, the input fibers are bundled and enclosed by an enclosure 205. In the third part 2052, the fibers and the enclosure have been subject to heat (and possibly evacuation) and thereby fused to fully or partially remove the air space between the fibers end the inner wall of the enclosure (cf. 1035 in FIG. 1) as indicated by the dashed cross-sectional view (203', 2035') at the end face 2054 of the second input sub-section 2012. The outer dimension (here shown as a diameter of a circular outer periphery) of the fused input fiber bundle at the end face 2054 to be joined with the output section is indicated with reference numeral 2056. The intermediate (second) part 2051 constitutes a gradual transition between the first and second parts to ensure a low loss (preferably adiabatic) coupling. The fusing results in a more compact cross section of the input fiber bundle, whereby the outer dimension of the fused part of the enclosure is slightly shrunk. Any possible outer protective coating 204 (e.g. a polymer coating) of the input fibers 203 has been removed at least over the length of the second part 2052 of the enclosure 205, where the assembly is heated. The fusion may e.g. be performed by heating in a conventional fusion splicing apparatus. A cross section of the fused input fiber bundle (and the surrounding enclosure) is schematically shown in FIG. 4c and in reality by the photomicrograph of FIG. 5. The tubular enclosure of the second input sub-section 2012 comprises a first end face 2053 where the loosely assembled fibers 203 enter the tube and a second end face 2054 constituting an end face of the input section 201 as well. The typically plane end face 2054 of the input section is a joint end face between the tubular enclosure 205 and the input fibers 203.

Figure 3A:
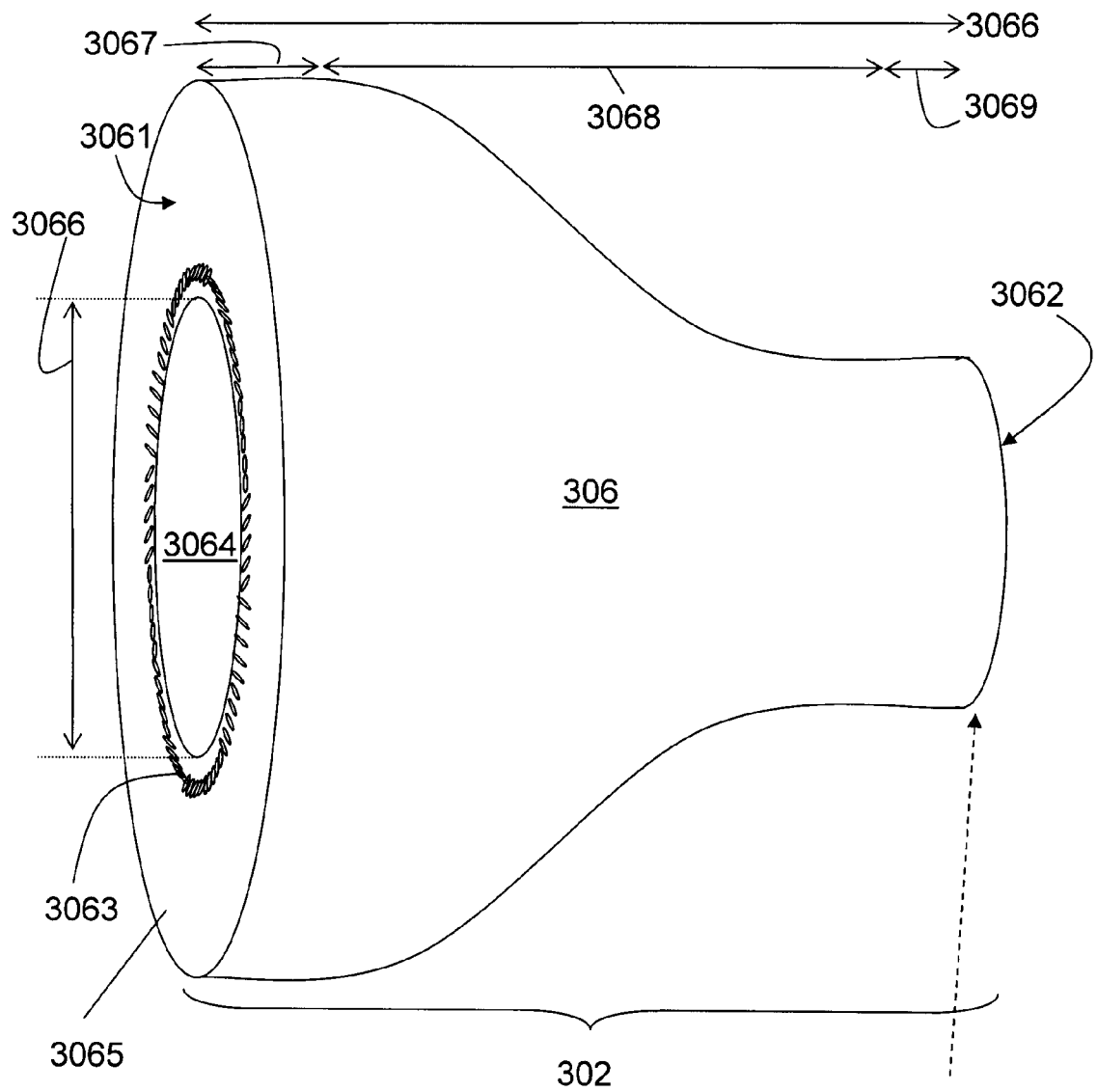
FIG. 3 shows an output section of an optical coupler according to an embodiment of the invention in the form of a tapered output fiber.
Figure 3B:
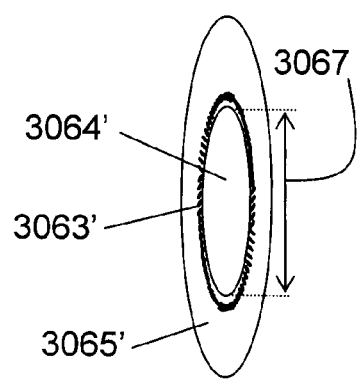

FIG. 3 shows an output section 302 of an optical coupler according to the invention in the form of a tapered output fiber 306. FIG. 3a shows the tapering of the output fiber 306 including a (perspective) cross sectional view of a first end face 3061 of the (un-tapered) output fiber and FIG. 3b shows a (perspective) cross sectional view of a second end face 3062 of the (down-tapered) output fiber. Here the diameter is decreased by a factor of ~3, and the Numerical Aperture is increased by the same factor—at least if brightness conservation applies. The tapering is performed over a tapering length 3068 of the output fiber to ensure a low loss propagation of the signals. The output fiber thus has a total longitudinal extension 3066 comprising an un-tapered length 3067, a tapered length 3068 and a down-tapered length 3069 (the down-tapered length having substantially constant cross sectional dimensions). The output fiber comprises a central light propagating region 3064, 3064', an air-cladding 3063, 3063' and an outer surrounding region 3065, 3065' (e.g. functioning as a cladding and/or mechanically protective region), the n- and n'-numerals referring to the un-tapered and down-tapered cross sections, respectively. The inner diameter of the air-cladding in the un-tapered and in the down-tapered regions are indicated by numerals 3066 and 3067, respectively. As an alternative or in addition to the air-cladding, a low-index cladding region (e.g. a ring of down doped cladding material (e.g. using F-doping)) positioned just inside the air-cladding) surrounding the regions of the output fiber intended for propagating light from the input section may preferably be included, cf. FIG. 8, below. The inclusion of a low-index ring within the air-cladding is of a particular advantage at the interface (cf. 407 in FIG. 4a) between the input and output sections to provide good confinement even if the air-cladding is damaged (e.g. due to hole collapse) over a length around the interface, e.g. due to heating (e.g. fusion splicing).

FIG. 4 shows an optical coupler according to the invention, FIG. 4a showing a longitudinal perspective view and FIGS. 4b-4e showing transversal views along the length of the coupler.

The features of FIGS. 2 and 3a are identical in FIG. 4a-e (only that the reference numerals are preceded by a 4 instead of a 2 or 3 in FIG. 2 or 3, respectively).

FIG. 4b is a cross-sectional view of the input section at a location where the input fibers 403, 4031 are bundled and enclosed by the enclosure 405, but not fused. FIG. 4c shows a cross section of the input section, where the input fibers 403' and the input enclosure 405' have been fused together. FIG. 4d shows a cross section of the un-tapered part of the output section, where the confining region 4064 is surrounded by an air-cladding 4063, which again is surrounded by a surrounding cladding region 4065. The outer dimension 4056 of the fused bundle of input fibers 403' is preferably smaller than or equal to the outer dimension 4066 of the confining region 4064 of the output fiber. FIG. 4e shows a cross section of the down-tapered part of the output section, the down-tapered output fiber comprising a confining region 4064', surrounded by an air-cladding 4063', which again is surrounded by a surrounding cladding region 4065'. The outer dimension 4067 of the confining region is 2-5 times smaller than at the untapered part.

The end faces 4054 and 4061, respectively, of the input and output sections are optically coupled, preferably by fusion splicing of the two elements. Alignment of the two sections at their interface 407 to ensure good optical coupling may e.g. be performed by geometrical or active alignment, the latter comprising monitoring the transmission of light from input to output section while aligning the input and output sections to achieve minimum loss.

Preferably, the cross sectional dimensions of the fiber bundle and the air-cladding are adapted at the interface 407 to ensure a low loss coupling. Preferably, the cross sectional dimensions 4066 of the confining entity of the output fiber is slightly larger than the outer dimension of the input fiber bundle 4056 at the interface 407. In an embodiment, the inner diameter of the air-cladding is 350 μm and the outer diameter of a circle enclosing the input fibers is 340 μm (both at the interface 407). In practice, smaller absolute tolerances are possible, if the process is optimized.

Figure 5:
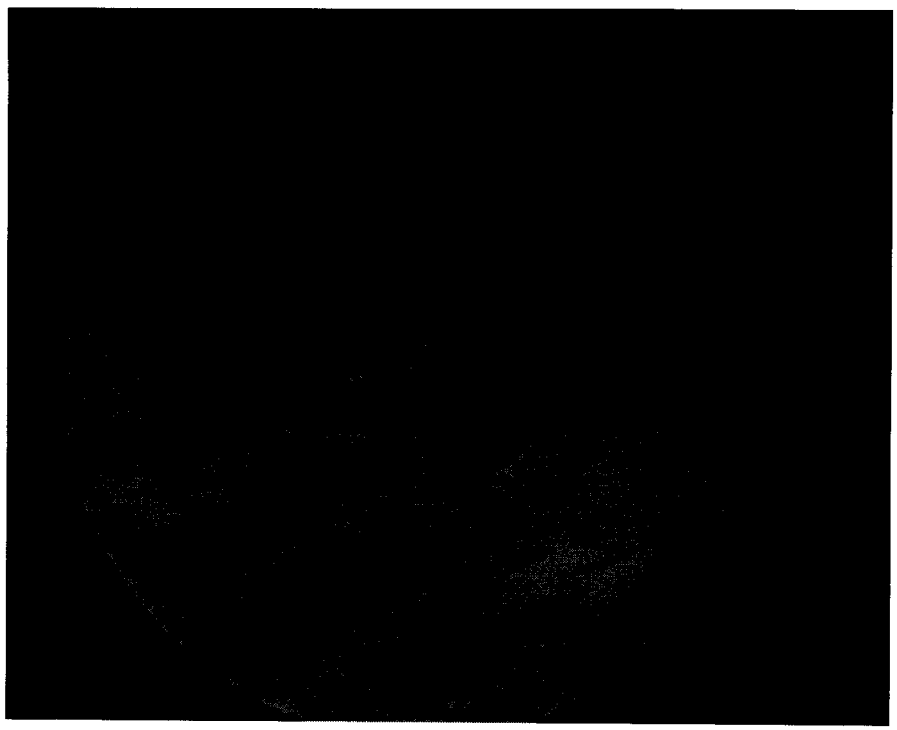
FIG. 5 shows a photomicrograph of a cross section of the second input sub-section of an optical coupler as schematically indicated in FIG. 4c.

FIG. 5 shows a photomicrograph of a cross section of the second input sub-section of an optical coupler as schematically indicated in FIG. 4c.

FIG. 5 shows a realization of a close packing of 7 standard pump fibers. Each fiber has a NA of 0.22. They have been packed into a tube and heat treated to fuse everything together. Optical measurements have been performed to ensure that each of the 7 cores still carry pump light. Also, Far Field (FF) measurements have been made to ensure that the changing of the core shape is done so gradually that the light is not coupled into higher order transverse modes. If that was the case, the Numerical Aperture would increase and the brightness decrease.

Figure 6:
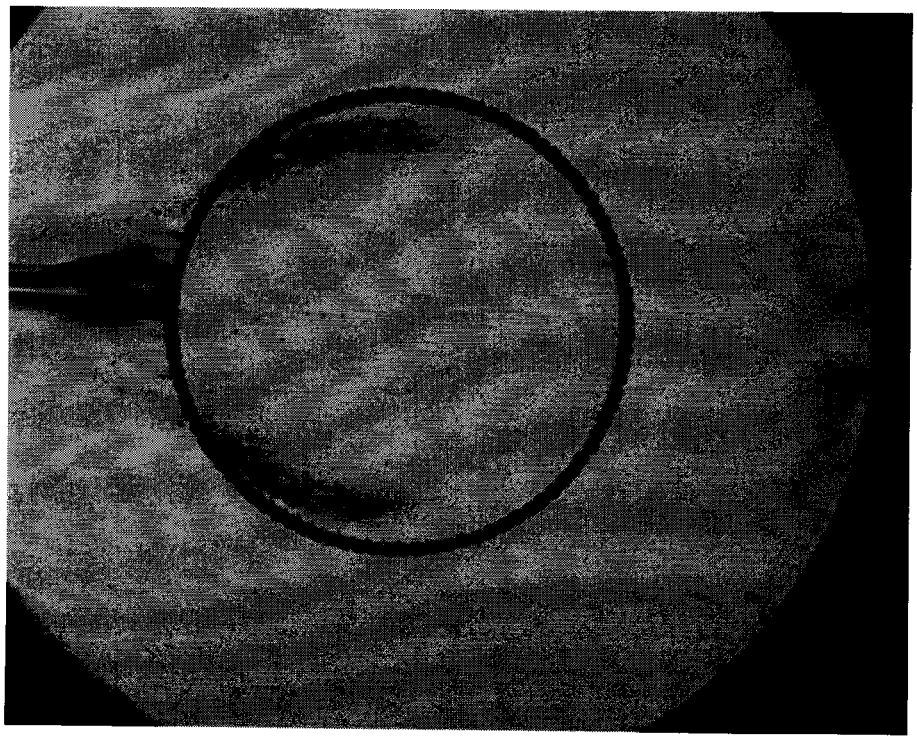
FIG. 6 shows a photomicrograph of a cross section of a down-tapered output section of an optical coupler as schematically indicated in FIG. 4e.

FIG. 6 shows a photomicrograph of the cleaved end facet of a down-tapered output section of an optical coupler as schematically indicated in FIG. 4e.

The output section was produced by first applying heat to the original (here multimode, MM) output fiber while pulling, thereby performing a gradual taper. The tapering can be performed with any appropriate factor depending on the application and the fiber design. The taper is preferably made gradual enough to obtain an adiabatic transition of the MM light and thereby maintain brightness. In this example, the element was tapered down to one third of the original size. Optical measurements have been performed to measure transmission loss and far field characteristics. Those measurements confirmed that the fusing, splicing and tapering was made with very low loss and without mode coupling to higher order transverse mode, which is needed to conserve brightness.

The use of a tapered waveguide element (in the form of a tapered output fiber in an optical coupler according to the invention), rather than a tapered fiber bundle according to the prior art, may have one or more of the following advantages:

Low levels of contamination: Except for the coupling region between the input and output sections of the optical coupler, i.e. end faces 4054 and 4061 at interface 407 in FIG. 4a (e.g. made by fusion splicing, which can be made with low loss), the light never reaches any surface or even an interface of what used to be a surface exposed to the environment and human handling (prior to the assembly in the optical coupler). The raw materials for the tapered waveguide element can be made on a fiber drawing tower and in long lengths. This avoids manual handling of the element in the critical stages, where contamination can enter into the element.

Better preservation of brightness: In prior art solutions (cf. WO 2005/091029), the material thickness of the air-clad tube (within the air-cladding) surrounding the fiber bundle does not contribute to the propagation of optical power. In embodiments of the present invention this area can be utilized to improve brightness.

More production-friendly assembly: In prior art solutions (cf. WO 2005/091029), the fused fiber bundle was inserted into a ring element containing a ring of air holes. By using the present invention it is no longer necessary to fuse the ring element around the fiber bundle. Such fusing can be challenging as the high temperature fusing carries a risk of damaging the holes in the ring element. The tapered waveguide element circumvents these fusion issues. This improves reproducibility and quality in production.

Single Mode (SM) signal feed-through in the combiner: The demands for large cladding diameters can be included in the tapered output fiber, since with the present invention the material of the cladding around the SM core and the material carrying the pump light can be the same. This may provide one or more of the following advantages:

Reduction of brightness loss of the pump (because the input signal fiber can occupy a lesser cross sectional area of the input fiber bundle see, see e.g. FIG. 10).

Possibility to make detailed waveguide design of the inner cladding to ensure large MFD both before and after the taper section.

Realization: The central fiber of the fiber bundle can be a SM fiber, carrying an optical signal. Since no tapering takes place in the bundling (and possibly fusing) process in the second input sub-section of the optical coupler, the fusing will have no effect on the modal properties of such a SM core (e.g. the cut-off and Mode Field Diameter remains the same). If the fiber for the tapered output fiber is designed such that is also includes a SM core in the inner cladding, such feed-through can be realized. The fiber for the output section is advantageously designed and produced such that the optical performance of the SM waveguide is satisfactory in both the un-tapered region, the taper region and the parallel down-tapered region (cf. regions denoted 3067, 3068 and 3069, respectively, in FIG. 3a).

Distribute transmission losses: The tapering region and the splice region can be spatially separated. If the combined losses cause thermal problems, the two regions can be separated such that the thermal issues can be handled separately (by increasing the length of the un-tapered region, cf. e.g. 3067 in FIG. 3a).

Decreased splice losses:

The second input sub-section of the optical coupler can be produced such that the light is guided by Total Internal Reflection, where the cladding has an index lower than the core. Typically the Numerical Aperture is 0.22 or 0.17, although other values have been seen. At all points along the length of the second input sub-section, the light never reaches any surface or interface. This means that any contamination or disturbance of the fiber surface during production will have no detrimental effect of the light transmission, even at high optical powers.

The tapered output section can be designed such that the glass material inside the (possibly MM) core can have a higher refractive index than that of the cladding. This means that light in region 3067 in FIG. 3a is guided by refractive index differences between non-microstructured solid materials (rather than confined by holes of a possible air cladding). In such a case, a fusion splice for implementing an optical coupling of the input section to the output section can be performed at very high temperatures, such that the glass interface between the second input sub-section and the output section (fiber) can be made with good mechanical strength and with good optical transmission. When splicing at such high temperatures, holes of an air cladding will typically suffer in the heating region. This will have no or little negative effect, however, since holes have no optical importance in this region, if a cladding region surrounding and having a lower refractive index than the regions of the fiber adapted to propagate the light from the input section is present in the output fiber within the possible air-cladding. The low optical loss and the high mechanical strength, makes such a high temperature fusion splice high-power compatible.

Increased mechanical strength: Since all elements and splices can be made at high temperature and since large geometrical sizes of the glass can be used, the mechanical strength is improved.

Increased thermal handling capability: Since the optical coupler (and in particular the output section) can be made both thicker and longer with the present invention, better thermal management is possible. Distributing the heat over a large volume is a key parameter in controlling the temperature under high-power operation.

EXAMPLE 1

An Optical Coupler for Providing Pump Light

Figure 7A:
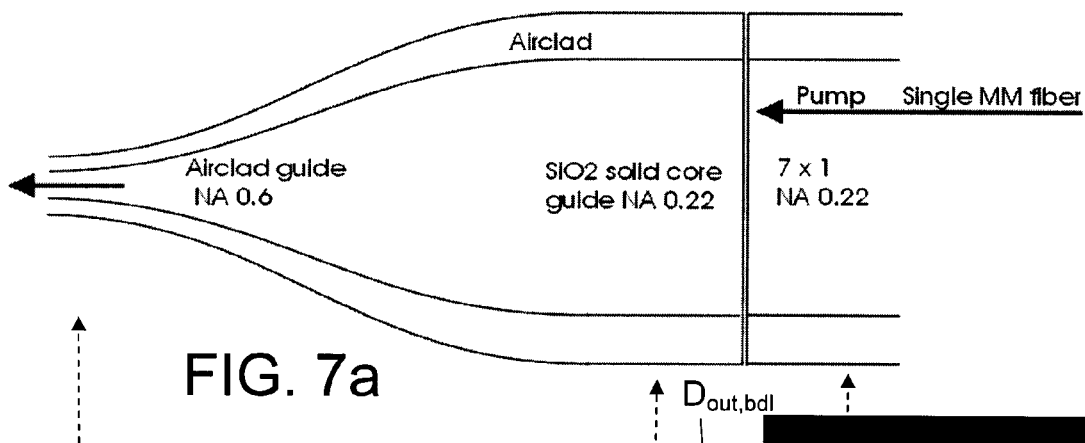
FIG. 7 shows an embodiment of an optical coupler according to the invention, FIG. 7a schematically illustrating the interface between the input and output sections and FIGS. 7b-7d showing photomicrographs of different cross sections of an implemented device along the length of the coupler.
Figure 7D:
Figure 7C:
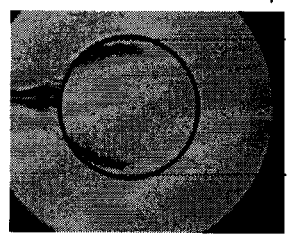
Figure 7B:
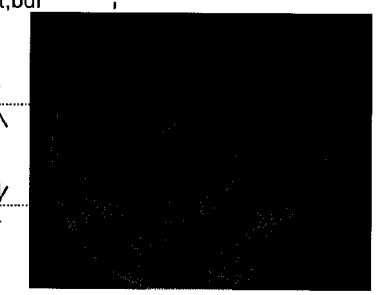

FIG. 7 shows an embodiment of an optical coupler according to the invention, FIG. 7a schematically illustrating the interface between the input and output sections and FIGS. 7b-7d showing photomicrographs of different cross sections of an implemented device along the length of the coupler.

This section describes the realization of a pump combiner with 7 pump fibers. The combiner is realized using a Vytran GPX-3100 for tapering and fusing, while splicing is performed on a Vytran LDS-1250. On both machines a F100-12525-N10 tungsten filament is used. Cleaving is performed on a Vytran LDC-200. All Vytran apparatuses are from Vytran Corp. (Morganville, N.J., USA).

Seven pump fibers of 0.5 m length were prepared with 6 cm uncoated ends. Pump fibers with 105 μm core, 118 μm outer diameter and 200 μm coating diameter are used. The pump fibers support up to 0.22 NA. Such fibers can e.g. be obtained from LG Optics (Light Guide Optics GmbH, Rheinbach, Germany).

A cladding tube (second input sub-section) with inner diameter (ID) of 370 μm and outer diameter (OD) of 900 μm was prepared. The 7 pump fibers were inserted into the cladding tube, which ensures a close-packed formation as illustrated in FIG. 1. In general, it is advantageous that the inner diameter of the enclosing tube around the input fibers is larger than the sum of the outer diameters of the (optionally uncoated) close packed input fibers in the intended configuration, e.g. 2% larger, such as 5% larger. In general, when a larger number of input fibers are present, a perfect close packed arrangement may not be possible or feasible. The term 'close packed' is here taken to mean, 'as close as practically possible in the given configuration'.

The close-packed section of the device is e.g. fused in a two step process, which is preferably optimized depending on the particular configuration:
First step at medium temperature (up to 200 W filament power) to fuse the fibers and cladding tube together (thereby fully or partially removing interstitials).
Second step at high temperature (up to 250 W filament power) to shape the fibers and cladding tube to obtain a substantially circular outer perimeter of the fused bundle to minimize the area of the smallest circular enclosure of the fiber bundle and to obtain a good utilization of the substantially circular confining region of the output fiber.

The fusing is e.g. performed by moving the filament along the length of the bundle at a speed of 0.5 mm/s. In both processes, a vacuum (50-500 mbar) is applied to remove interstitial holes between the fibers and/or the inner surface of the enclosing tube. The temperature is ramped up over a length of 15 mm to ensure an adiabatic fusing of the pump fibers (cf. intermediate section 2051 in FIG. 2).

The fused input fiber bundle and enclosing tube was cleaved and a cross section as depicted in FIG. 5 was realized. The outer diameter of the fused section is 880 μm and an ID of 340 μm encloses the 7 pump fibers. The second input sub-section of the optical coupler (fuse element) is ready to be spliced to the output section (taper element).

An output section or taper element comprising an output fiber in the form of an air-clad and index guided fiber with ID of 350 μm and OD of 882 μm was prepared. The second input sub-section or fuse element was spliced to the taper element. The splice was performed at high temperature (205 W filament power, 5 sec).

Several centimeters away from the splice, a section of the air-clad fiber was tapered from an ID of 350 μm to an ID of 115 μm (210-105 W filament power). The diameter was reduced over 7 mm to perform an adiabatic taper (cf. region 3068 in FIG. 3a), preferably with a parabolic taper profile.

The fiber was cleaved and a taper element with a cross section as depicted in FIG. 6 was realized.

An optical coupler in the form of a pump combiner with 7 fibers was hereby realized. When launched with 0.19 NA into the individual input pump fibers, an output from an air-clad guided 115 μm core with an NA of 0.58 is obtained.

The tapered output of the pump combiner can e.g. be spliced to a delivery fiber (e.g. using 105 W filament power, 5 sec).

Pump diodes (JDSU, 915 nm wavelength, 0.19 NA) were spliced to the pump fibers to test the performance of the fused tapered pump combiner. Optical measurements indicate that light is confined in the core of the tapered air-clad fiber. A transmission loss of less than 0.25 dB through the full fused tapered pump combiner is measured. Furthermore, NA measurements indicate that the output NA stays below the input NA magnified by the taper ratio.

Figure 8B:
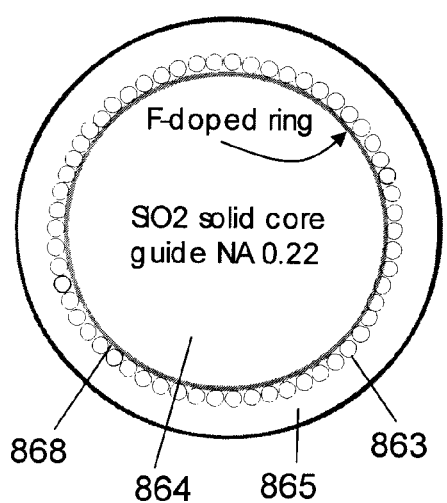
FIG. 8 shows transversal cross sections of an input section (FIG. 8a) and an output section (FIG. 8b) of a preferred embodiment of an optical coupler according to the invention.
Figure 8A:
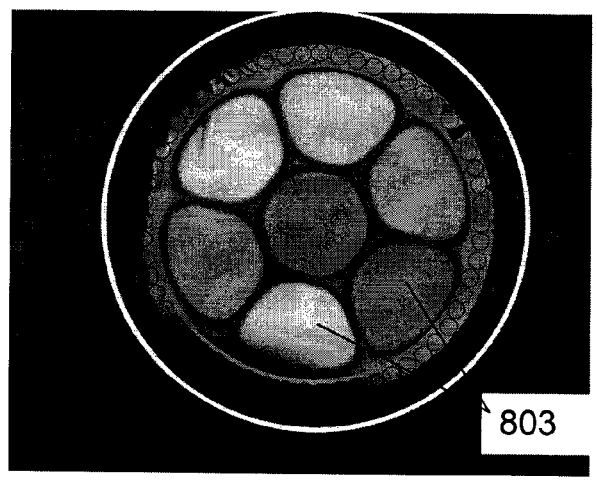

FIG. 8 shows transversal cross sections of an input section (FIG. 8a) and an output section (FIG. 8b) of a preferred embodiment of an optical coupler. In FIG. 8b the confining region is a solid silica core 864 surrounded by a (down-doped) low-index cladding ring 868 (here an F-doped ring), which again is surrounded by a ring of closely spaced relatively large micro-structural elements (here air holes), constituting a so-called air-cladding 863. The air-cladding is again surrounded by an outer cladding region 865 that provides mechanical support and stability of the fiber and optionally a further protective coating. The down-doped low-index cladding ring ensures confinement of the light propagated by the optical coupler even if the surrounding air cladding is damaged (i.e. if e.g. the holes are diminished or fully collapsed, e.g. near the interface to the input section, where heat is applied). FIG. 8a shows a photomicrograph of an end face of an input section wherein the input fibers 803 have been fused in an enclosing tube. For illustration, the air cladding and the low-index cladding ring of the output fiber are indicated in the cross section. In general, the actual dimensions of the output fiber at the interface to the input fiber bundle are adapted according to the specific situation (i.e. depending on the cross sectional size and number of the input fibers at the interface). An example of corresponding characteristic dimensions of the input fiber bundle and the output fiber at their mutual interface are:

| | |
|---|---|
| Outer diameter of input fiber bundle: | ~331 μm |
| Inner diameter of low-index-ring: | ~335 μm |
| Inner diameter of air-cladding: | ~350 μm |
| Outer diameter of output fiber: | ~550 μm |

In Example 1, it was described how a low-index ring (e.g. an F-doped ring) near the air-clad will allow for a warm low-loss splice even if the air-cladding is collapsed in the process. In order for the signal of a centrally located signal input fiber to also see a low loss splice, the signal waveguides must also be tolerant to excessive heat. This requirement ties together the two aspects described in Example 2 and 3 below.

EXAMPLE 2

An Optical Coupler with Signal Feed Through

The present example deals with an optical coupler suitable for use in a fiber amplifier, wherein the input section comprises a centrally located signal fiber surrounded by a number of pump fibers and wherein the tapered output section of the optical coupler comprises a centrally located region adapted for guiding the signal light in a single mode and surrounded by a region for guiding the pump light.

In prior art tapered fiber bundle couplers, the same fibers constitute the cross section at every point from input to tapered output. In the approach described here a single-mode fiber and a number of pump fibers are fused together in a bundle and subsequently cleaved without tapering to create an output face of an input section of the coupler. The fused bundle is then spliced to the output section in the form of a double clad fiber, which is cleaved (to form an input end face) and tapered. The other end of the output section of the optical coupler can then be spliced directly to a device or to a delivery fiber. The approach of using a splice before the taper makes is possible to have different single-mode waveguides in the two fiber structures.

Moreover, the micro-structured signal feed-through fiber (cf. below) is only present in the tapered output section and not needed in the input section (which saves area in the input section). A relatively large MFD of a solid input signal fiber may e.g. be obtained by making fibers using composite materials as described in WO 02/088802.

A characteristic feature of a preferred signal feed-through fiber design is that it has a relatively large outer diameter in order to make room for both the inner and outer waveguide. Since the number of pump fibers, which can be incorporated into a combiner is limited by the available cross-sectional area of the confining region, e.g. the inner cladding, of the output fiber (which is preferably larger than or equal to the area of the fused bundle of the input section), it is desirable that the signal fiber takes up as small an area in the input section as possible. The splitting of the fusing (input) and tapering (output) section thereby allows for having a relatively thin standard single-mode fiber in the fusing section and thereby incorporating more pump fibers into the same cross-sectional area.

In the following, the improvement in brightness (compared to a prior art solution) by implementing the optical coupler by combining two separate sections according to the present invention is exemplified.

Figure 9:
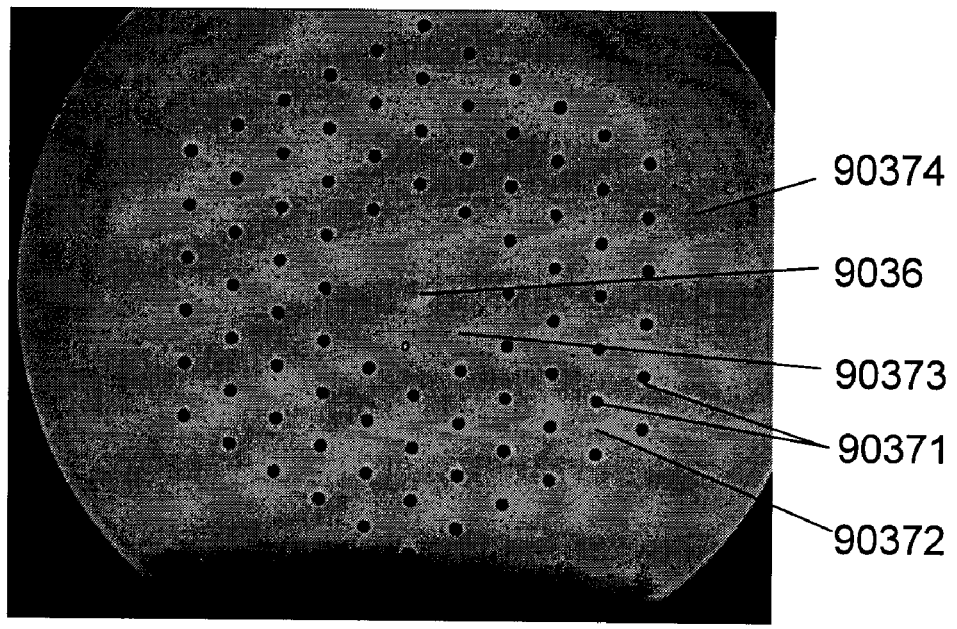
FIG. 9 shows a cross section of a 20 μm mode field diameter feed-through fiber with a 450 μm cladding diameter.

In a practical realization of a prior art tapered bundle combiner comprising a micro-structured feed-through fiber with a 20 µm mode field diameter, the cladding diameter was 450 µm, cf. FIG. 9. In a cross section perpendicular to a longitudinal direction of the fiber, parallel to the optical axis of the fiber, the fiber has a centrally located core region 9036 and a cladding region surrounding the core region, the cladding region comprising an inner, solid region 90373 and a micro-structured intermediate region comprising micro-structural elements 90371 in a substantially close-packed arrangement (i.e. located on a substantially triangular lattice) embedded in a cladding background material 90372 and an outer solid cladding region 90374 surrounding the micro-structured cladding region. The fiber may be a single material fiber (e.g. silica) possibly, comprising index modifying elements to enhance or decrease the refractive index of a particular region. The single material property is taken to refer to the core and cladding background material (i.e. exclusive of the micro-structural elements that may be voids or comprise a fluid or solid material).

In the present case, where only a simple single-mode fiber is used, the diameter could be reduced to the order of 200 µm. This corresponds to a reduction in area comparable to more than 12 pump fibers (assuming a pump fiber with a cladding diameter of 114 µm). This is illustrated in Table 2 showing that for a pump fiber diameter of 114 µm 18 ports can be fitted into a fused (input) section diameter of 523 µm when the signal fiber is 200 µm in outer diameter. This corresponds to only 6 pump ports for a 450 µm signal fiber diameter and even slightly larger fused section diameter.

TABLE 1

Example of how a smaller signal feed-through fiber can be traded for an increased number of pump ports

| Number of Pump fibers | Signal fiber diameter [µm] | Pump fiber Diameter [µm] | Fused section Diameter [µm] | Pump NA | NA out | Tapered inner clad [µm] |
|---|---|---|---|---|---|---|
| 6 | 450 | 114 | 530 | 0.22 | 0.60 | 194 |
| 18 | 200 | 114 | 523 | 0.22 | 0.60 | 193 |

Rather than increasing the number of pump ports, an option is to use the thinner signal fiber for obtaining smaller tapered inner cladding dimensions for the same output NA. Realizing a pump signal combiner with 6 pump ports based on 114 µm cladding diameter fiber would result in an inner cladding area reduction by a factor of 2.4 when reducing the signal fiber diameter from 450 µm to 200 µm. These results are summarized in the table below.

TABLE 2

Inner cladding diameter for pump signal combiner with fixed number of 6 pump ports and signal fiber diameters of 450 µm and 200 µm, respectively.

| Number of Pump fibers | Signal fiber diameter [µm] | Pump fiber Diameter [µm] | Fused section Diameter [µm] | Pump NA | NA out | Tapered inner clad [µm] |
|---|---|---|---|---|---|---|
| 6 | 450 | 114 | 530 | 0.22 | 0.60 | 194 |
| 6 | 200 | 114 | 343 | 0.22 | 0.60 | 126 |

The comparative examples of Tables 1 and 2 are illustrated in FIGS. 10*a*, 10*b* and FIGS. 10*c*, 10*d*, respectively. Pump NA refers to the NA of the input pump fibers.

FIG. 10 shows a comparison of cross-sectional views of an input section in cases where a relatively thick (FIGS. 10*a*, 10*c*) and a relatively thin (FIGS. 10*b*, 10*d*) centrally located input signal fiber (surrounded by a number of pump fibers) is used, case 1) (FIGS. 10*a*, 10*b*) keeping the same cross-sectional area at the output end of the input section and case 2) (FIGS. 10*c*, 10*d*) keeping the same number of peripheral input pump fibers. The shaded area represents the area, which is taken up by the input pump fibers (here having a polygonal cross-section in a cross section of the fused output end of the input section).

The idea is to substitute the complex signal feed-through fiber in the fused element with a simple single-mode fiber which can be realized with a smaller cross-sectional area. This decreases the loss of pump brightness caused by the area taken up by the signal fiber. In turn, a better preservation of brightness allows for adding more pump ports and/or tapering to smaller pump guide dimensions.

EXAMPLE 3

An All-Solid Signal Feed-Through Fiber

This aspect relates also to the published PCT-application WO 2005/091029 and can be used in connection with but is NOT restricted to use in the above described 'two-part' optical coupler (but can be used in couplers based on a tapered bundle of fibers).

The idea is to substitute air-holes in the micro-structured feed-through fiber with solid glass inclusions having lower refractive index than the base material (e.g. silica). This eliminates the problem of holes in the feed-through fiber collapsing when this is incorporated into the fused bundle, tapered and spliced. Collapsing of holes is a major concern since the fusing of pump and signal fibers into a round bundle require excessive heat.

In its broadest aspect, the idea thus covers an optical coupler for coupling light from at least two input fibers into one output fiber, the optical coupler comprising a microstructured feed-through fiber with solid glass inclusions having lower refractive index than the base material wherein they are embedded.

The solid micro-structural optical fiber design of the present example can thus be used as an input (signal) fiber and/or as a central region for guiding signal light in the tapered output fiber or as a feed through signal fiber of a tapered bundle type coupler. An advantage thereof is that the micro-structural elements are not damaged due to heating during fusing and/or splicing and/or tapering of the optical coupler.

How to realize the all-solid feed-through fiber:

The basic properties of the classic air-hole structure of the PCF are primarily due to the large index contrast between glass and air and the strong dispersive behavior caused by the geometrical arrangement of the air holes. Considering a silica base material (n=1.4500) with air holes (n=1.0000) for which the air-holes are substituted with a low refractive index glass, the same overall type of dispersive properties occur. However, since the index contrast is smaller the guiding will be weaker. To partly overcome this, the size of the cladding features can be increased.

The lower refractive index of the cladding features the better. Current state of the art makes it possible to obtain Fluorine doped silica with a refractive index of 1.4400 yielding an index difference of $10^{-2}$.

Figure 11:
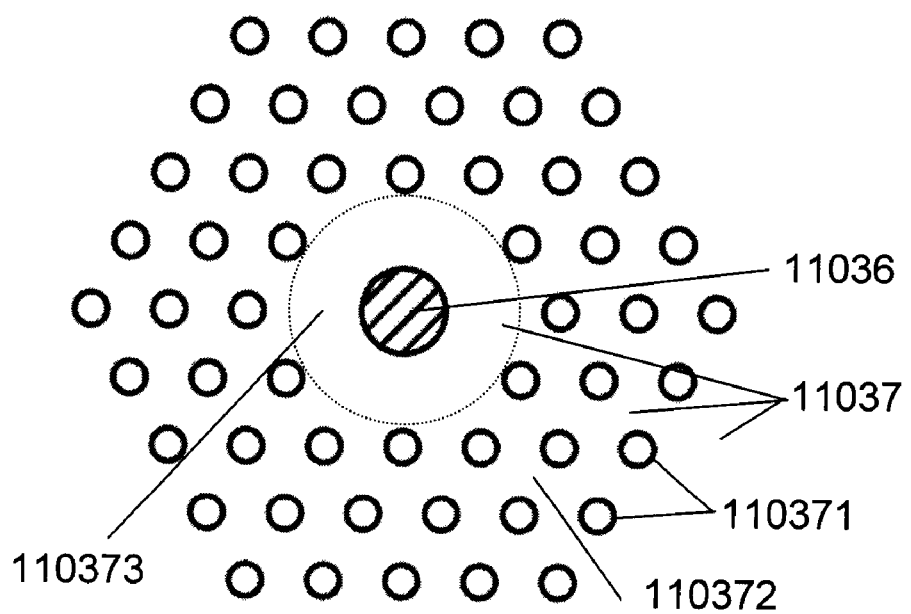
FIG. 11 shows a partial cross-sectional view of a microstructured optical fiber for use as a general signal feed through structure.

Numerical example of solid feed-through fiber:

FIG. 11 shows a schematic drawing of the general feed-through structure. The micro-structured optical fiber comprises a high-index core region 11036 surrounded by a cladding region 11037 comprising an arrangement of solid, low-index micro-structural elements 110371 in a cladding background material 110372, wherein the first part of the cladding region 110373 immediately adjacent to the core region comprises no micro-structural elements. The first part of the cladding region 110373 referred to in FIG. 11 is the annular region limited by the core region and the dotted (circular) outline touching (without including) the nearest neighboring micro-structural elements to the core region. The refractive index of the cladding background material is between that of the high-index core region and that of the low-index micro-structural elements ($n_{core} > n_{back} > n_{micro}$). When such fiber design is tapered down (e.g. when used as the central part of an output fiber of an optical coupler according to the present invention), the signal propagated in the core region will eventually be forced out into the solid part of the cladding region but will then be confined by the micro-structure cladding region, thereby increasing the mode field diameter (compared to the dimension of the high-index core region), cf. e.g. WO 2005/091029, FIGS. 22-29 and pp. 50-58 and specifically FIG. 22 and the corresponding description on p. 51, 1. 8-p. 52, 1. 7.

In a preferred embodiment, a centrally located solid, single mode input fiber is used in the input section (cf. e.g. FIG. 10b or 10d) and a centrally located microstructured fiber design as shown in FIG. 11 (or FIG. 14c (reference numeral 140644) in the output section. Thereby the advantage of controlling the mode field diameter of the signal (including increasing MFD) during down-tapering of the output fiber as described in the preceding paragraph can be achieved.

Such an optical coupler is schematically shown in FIG. 12, which shows cross-sectional views of an (un-fused, as indicated by interstitials 12035) input section (FIG. 12a) and of an output section (FIG. 12b). The input section comprises a bundle of 6 multimode input pump fibers 1203 surrounding a centrally located single mode input signal fiber 12031, the bundle being located in a tubular enclosure 1205 and all input fibers being non-micro-structured, standard fibers (including fibers comprising composite materials as described in WO 02/088802). The input pump fibers 1203 comprise a core region 12032 for confining multimode pump light and a cladding region 12033. The central signal input fiber comprises a core region 12036 for propagating a signal in a single mode and a cladding region 12037. The output section comprises a core region 12066 for receiving and propagating signal light from the input signal fiber in a single mode (in the un-tapered section) and a surrounding cladding region comprising an inner solid region 120673 acting as a single mode core in the down-tapered part of the output section and a surrounding (intermediate) cladding region comprising a cladding background material 120672 wherein micro-structural elements 120671 (preferably solid) are embedded (here in a substantially periodic arrangement) and adapted to confine light of the signal wavelength in the down-tapered part of the output fiber and to propagate pump light together with an outer solid cladding region 120674. A surrounding region of the output fiber surrounding the confining region comprises a low-index ring 12068, an air-cladding 12063 and an outer solid cladding 12065 (at least for providing mechanical stability around the air-cladding). As indicated by the arrows between FIGS. 12a and 12b, the outer cross-sectional dimensions of (1) the fiber bundle of the input section and the confining region of the output sections and (2) the outer dimensions of the input section enclosure 1205 and the outermost region 12065 of the output fiber are preferably adapted to provide a minimum loss of the optical coupler when the input and output sections are assembled.

The design and fabrication of micro-structured optical fibers with solid cladding features is e.g. described in WO 02/101429.

The following example considers a feed-through fiber with a ~20 μm MFD, which can tolerate to be tapered by a factor of ~3. This means that the MFD is in the order of ~20 μm also at the tapered output (cf. e.g. FIGS. 4a, 4e).

The structure is fully characterized by the following parameters.

The center to center spacing of the micro-structural elements in the outer cladding region (the pitch) is denoted $\Lambda$.

The diameter of the cladding features (the micro-structural elements) relative to the pitch is $d/\Lambda$.

The diameter of the central core relative to the pitch is $D/\Lambda$.

The refractive index of the cladding features is $n_{micro}$.
The refractive index of the central core region is $n_{core}$.
The refractive index of the base material is n and $n_{clad} < n_{back} < n_{core}$ The wavelength of the signal is $\lambda_s$.

For a given set of the parameters above the mode-field diameter (MFD) can be calculated as a function of the pitch and (for a given start pitch, i.e. the pitch of the un-tapered output fiber) thereby also as a function of taper ratio. In order to consider the robustness of the waveguide the beat length to the first higher order mode is calculated assuming that this mode is a cladding mode or has attenuation characteristics as such. The shorter the beat length gets the more robust the waveguide will be.

Table 3 shows 3 different sets of parameters for the model. Design A is the reference design which uses air-holes in the cladding region. Design B and Design C are designs where the holes are substituted with low index glass.

TABLE 3

3 different designs of a 20 µm MFD signal feed through fiber

| | Λ [µm] | $n_{micro}$ | $n_{back}$ | $n_{core}$ | d/Λ | D/Λ |
|---|---|---|---|---|---|---|
| Design A | 1.06 | 1.00000 | 1.45000 | 1.45075 | 0.22 | 0.65 |
| Design B | 1.06 | 1.44000 | 1.45000 | 1.45075 | 0.40 | 0.65 |
| Design C | 1.06 | 1.44600 | 1.45000 | 1.45075 | 0.50 | 0.65 |

Figure 13A:
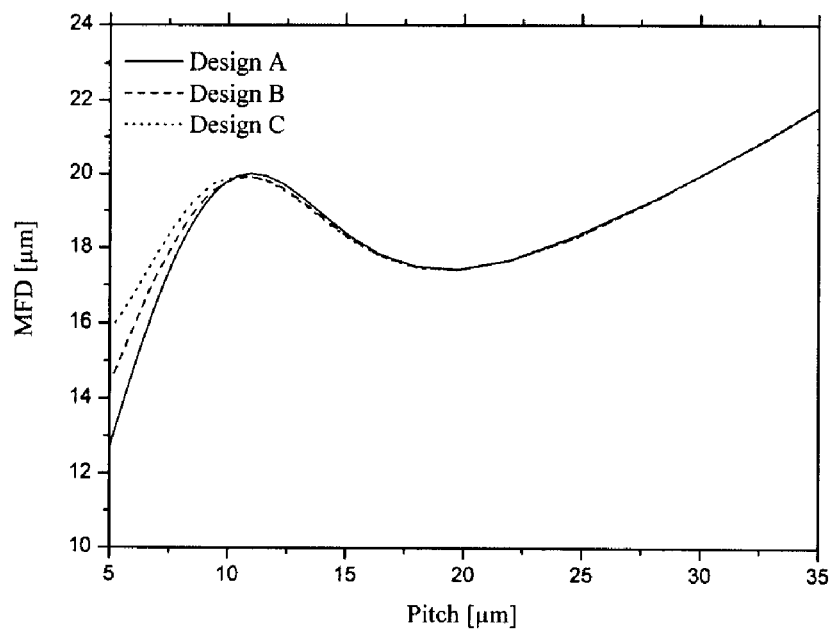
FIGS. 13a and 13b show, respectively, mode-field diameter and beat length as a function of pitch for the 3 designs listed in Table 3.
Figure 13B:
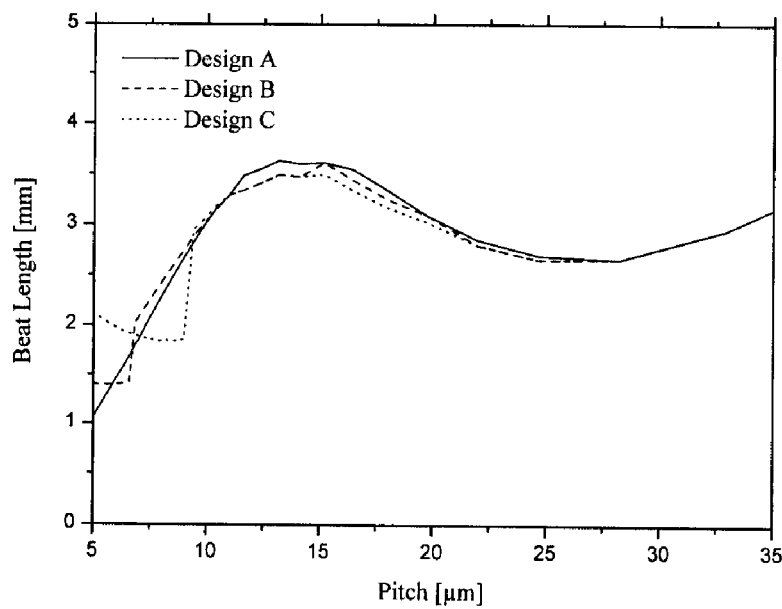

The index of the cladding holes in Design B corresponds to the currently lowest index which can presently be commercially obtained, using F (other index-modifiers may be used). Design C corresponds to low index regions with a refractive index of material already tested. All 3 designs yield the same performance both in terms of MFD (cf. FIG. 13a) and beat length (cf. FIG. 13b). This shows that the air holes can be substituted with solid inclusions provided that the parameter ratio d/Ë is adjusted accordingly.

EXAMPLE 4

Preferred Embodiments of an Optical Coupler

FIG. 14 shows a two-section optical coupler 1400 according to the invention (FIG. 14a) comprising originally separate input and output sections, which are optically coupled to each other during manufacturing (or use) and examples of cross-sectional views of possible input fibers (FIG. 14b) and output fibers (FIGS. 14c and 14d).

FIG. 14 shows a number of input fibers 1403, which are loosely assembled over a loose length 1421 and bundled over a bundling-length 1420. These two sub-sections form part of the input section. The input section has an output face, at least comprising the output faces of the individual input fibers. The bundle of input fibers are held together and the output face is optically coupled to an input face of an output section comprising an output waveguide 1406. The optical coupling between input and output sections at the input-output interface 1407 may include a but-coupling, a splice or any other coupling fixing the waveguides relative to each other and providing a relatively low optical loss. The output waveguide is tapered down from an initial cross-sectional area at the interface 1407 to the input section to a smaller cross sectional area over a tapering length 14068. The output fiber thus comprises a large area length 14067, a tapering length 14068 and a small area length 14069.

The input fibers may be of any appropriate kind (non-micro-structured or micro-structured, single mode or multi-mode) depending on the application. FIG. 14b shows a few examples of possible fiber designs that can be used, a non-micro-structured multimode fiber 140310 comprising a relatively large core and a cladding region, a non-micro-structured single mode fiber 140311 comprising a relatively small core and a cladding region, a micro-structured single mode or multimode fiber 140312, 140313 comprising a core and a cladding region comprising micro-structural elements in the form of voids (140312) or solid material (140313).

The output fibers may be of any appropriate kind (non-micro-structured or micro-structured, single clad or multi-clad) depending on the application. FIGS. 14c and 14d each show partial cross-sectional designs of an output fiber. FIG. 14c show examples of the confining region of the output fiber, i.e. the region of the output fiber intended for carrying the light propagated from the input section of the optical coupler. FIG. 14d shows examples of the surrounding regions of the output fiber, i.e. those parts of the fiber that (in combination with the confining region) is responsible for actually confining the light from the input section to the confining region of the output fiber. The outer extension of the confining region is shown by a dotted circle in the embodiments of FIG. 14d. The central parts of the cross sections (i.e. the areas within the dotted circle symbolizing the confining region) are left blank and intended to be filled with any one of the confining region designs of FIG. 14c as indicated by arrows at each of the four embodiments of FIG. 14c pointing towards the embodiments of FIG. 14d (or with any other appropriate design).

FIG. 14c shows (top) a confining region 140641 of a homogeneous material (e.g. for a multimode pump delivery application); (middle) a confining region 140642 comprising two regions of different refractive indices (i.e. forming a double cladding structure in combination with a surrounding cladding region of FIG. 14d, e.g. for separate propagation of pump and signal light); and (bottom) a confining region 140644 comprising a core region, an inner solid cladding region, an intermediate micro-structured cladding region, and an outer solid cladding region, the micro-structural elements being either voids or solid (or a combination), such structure being e.g. suitable for separate propagation of pump and signal light.

FIG. 14d shows (top) surrounding regions of the output fiber comprising an air-cladding 14063 and a further outer cladding 14065 surrounding the air-cladding (and in which the holes constituting the air-cladding may be embedded); (middle) surrounding regions comprising a low-index cladding ring 14068, an air-cladding 14063 surrounding the low-index cladding ring and a further outer cladding surrounding the air-cladding; and (bottom) a surrounding region comprising an outer low-index cladding 14068 (e.g. a polymer cladding).

The input fibers are preferably enclosed by a glass tube and fused together with the fiber bundle over part of its length to remove interstitials between the input fibers and then cleaved (and possibly polished) in the fused part to create a good output end face for optically coupling to an output fiber. The outer dimensions of the class tube and the output fiber are preferably substantially equal. The input and output sections are preferably fusion spliced to each other.

In a preferred embodiment an output end face of the output section is optically coupled, preferably fusion spliced, to an optical fiber or to an optical device.

Figure 15A:
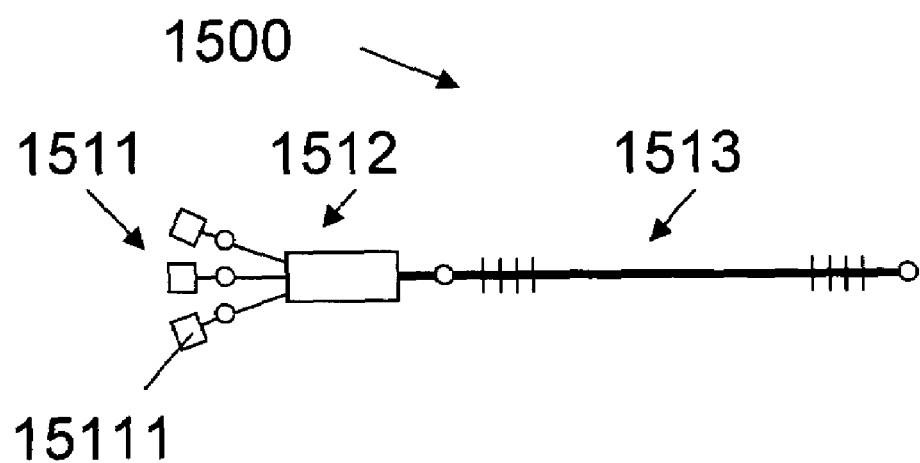
FIG. 15a shows a fiber laser comprising an optical coupler according to an embodiment of the invention and FIG. 15b shows a fiber amplifier comprising an optical coupler according to the invention.

In a preferred embodiment of an optical coupler, the input fibers are multimode pump fibers 140310 of FIG. 14b and the output fiber is a combination of the middle design in FIG. 14d of the surrounding region (having a low-index cladding region 14068 surrounded by an air-cladding 14063 and an outer solid cladding 14065) and the top design of FIG. 14c of the confining region (a non-micro-structured multimode region 140641). Such an optical coupler can be used for feeding high-power multimode pump light to a fiber laser, as illustrated in FIG. 15a. FIG. 15a shows an article 1500 comprising a fiber laser 1513 (comprising a length of an optical fiber with an optically active material and two reflecting elements defining a laser cavity) coupled to the output fiber of an optical coupler 1512 according to the invention. Multimode input waveguides of the optical coupler are connected to light sources 1511 (here in the form of a number of laser diodes 15111).

Figure 15B:
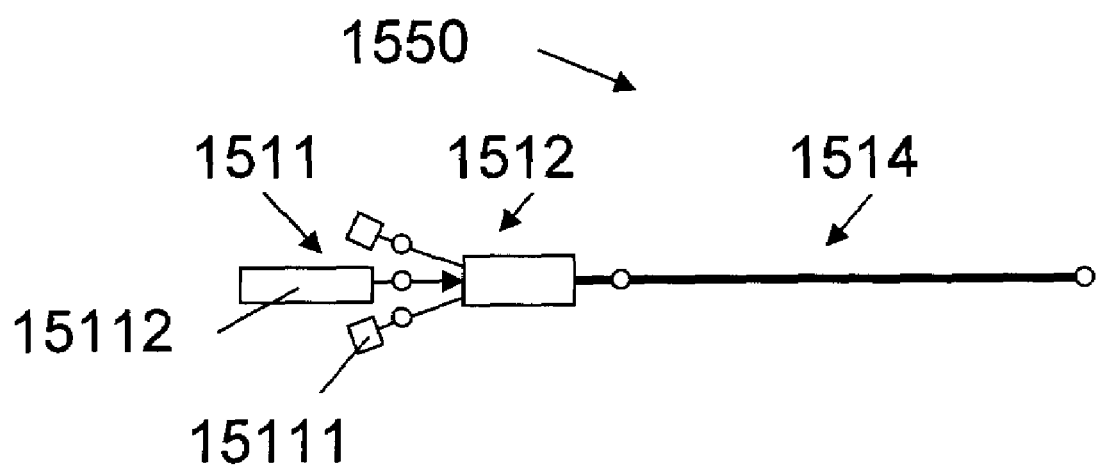

In another preferred embodiment of an optical coupler, the input fibers are non-micro-structured multimode pump fibers 140310 of FIG. 14b surrounding a centrally located non-micro-structured single mode signal input fiber 140311 of FIG. 14b and the output fiber is a combination of the middle design in FIG. 14d of the surrounding region (having a low-index cladding region 14068 surrounded by an air-cladding 14063 and an outer solid cladding 14065) and the bottom design 140644 of FIG. 14c of the confining region (a core region surrounded by an inner cladding region comprising, preferably solid low-index, micro-structural elements and an outer cladding region). When the output fiber is tapered down and the core region can no longer confine the (single) mode, it is captured in the inner solid part of the cladding region, which is spatially limited by the arrangement of micro-structural elements (as explained above and in WO 2005/091029, FIG. 22). Such an optical coupler can be used for feeding a single mode signal and high-power multimode pump light to an optical fiber amplifier, as illustrated in FIG. 15b. FIG. 15b shows an article 1550 comprising a length of an amplifying fiber 1514 (e.g. a double cladding fiber comprising a core region for carrying signal light surrounded by an inner cladding region for carrying pump light surrounded by an air-cladding) with an optically active material (e.g. a rare earth element) in the core region coupled to the output fiber of an optical coupler 1512 according to the invention. Multimode pump input fibers and a central signal input fiber of the optical coupler are connected to light sources 1511 (here in the form of a number of laser diodes 15111 providing pump light and a signal light source 15112 providing signal light to the central signal input fiber). The embodiment shown in FIG. 15b has co-propagating signal and pump light. If advantageous, the optical coupler can be located at the other end (to the right in FIG. 15b) of the amplifying fiber 1514 while maintaining the feeding of the input signal input signal (15112), where it is. Alternatively, an optical coupler may be applied at both ends to have co- as well as counter-propagating pump light, if a particularly high power is needed (both couplers providing signal feed through as well as providing pump light, the coupler being connected to the signal source, optionally also providing an MFD up-scaling (e.g. from 6 µm to 20 µm) to adapt a standard SM-MFD to a larger one used in the coupler).

It is an advantage of the optical couplers that it is possible to have mechanically contact to any point on the outer surface of the cladding. In preferred embodiments, this is utilized to build in one or more mode-strippers in the device. The purpose of a mode-stripper is to scatter unwanted cladding guided light out of the device. Mode-stripping may be done by making the surface rough. In preferred embodiments, the mode-stripping is done by making a non-uniform etching of the surface.

While etching may render the device mechanically weak (brittle), the present invention in preferred embodiments provides an optical coupler comprising an improved mode stripper, such as a mode stripper that does not render the device mechanically weak and/or improved the mode stripping performance in terms of higher power-handling capacity.

EXAMPLE 5

Preferred Embodiments of an Optical Coupler

Figure 16:
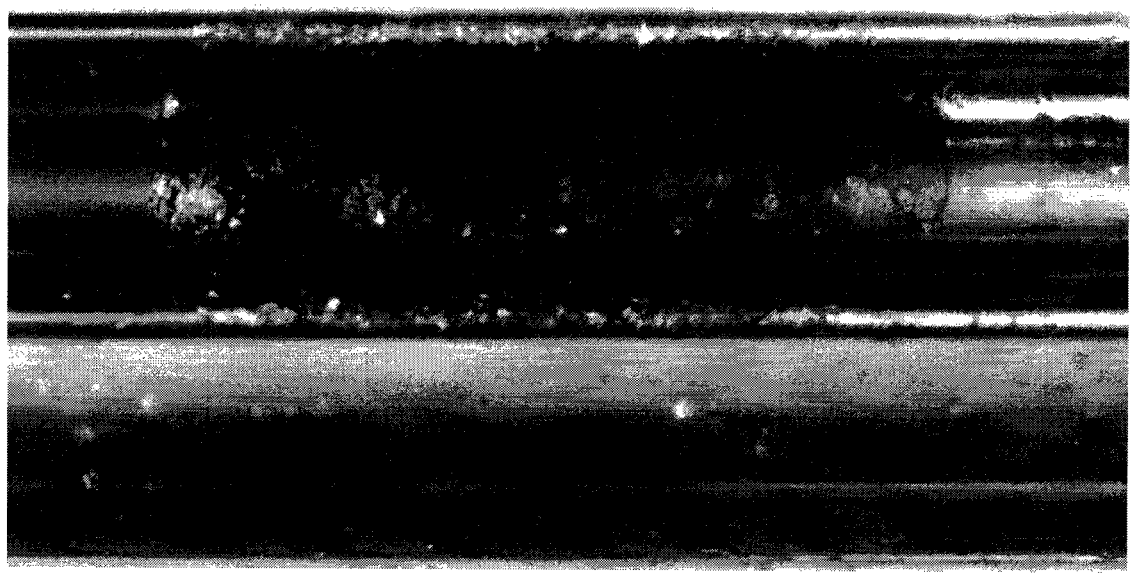
FIG. 16 shows a photomicrograph of an outer surface of an optical coupler according to a preferred embodiment of the invention.
Figure 17A:
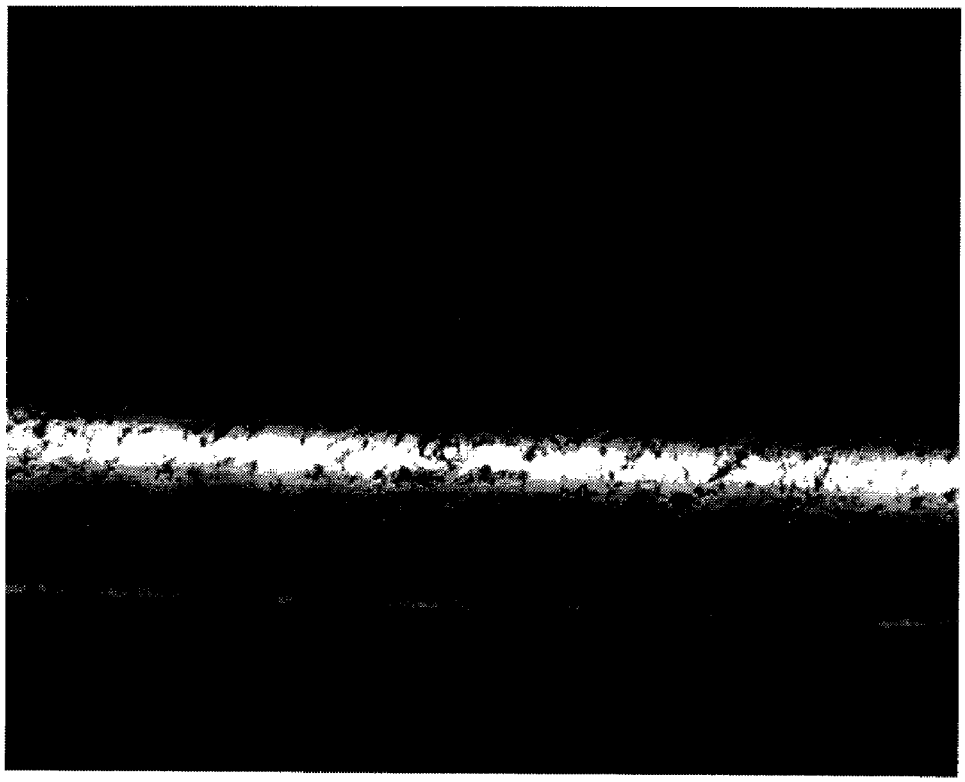
FIG. 17 shows photomicrograph examples of an outer surface of an optical coupler according to a preferred embodiment of the invention.
Figure 17B:
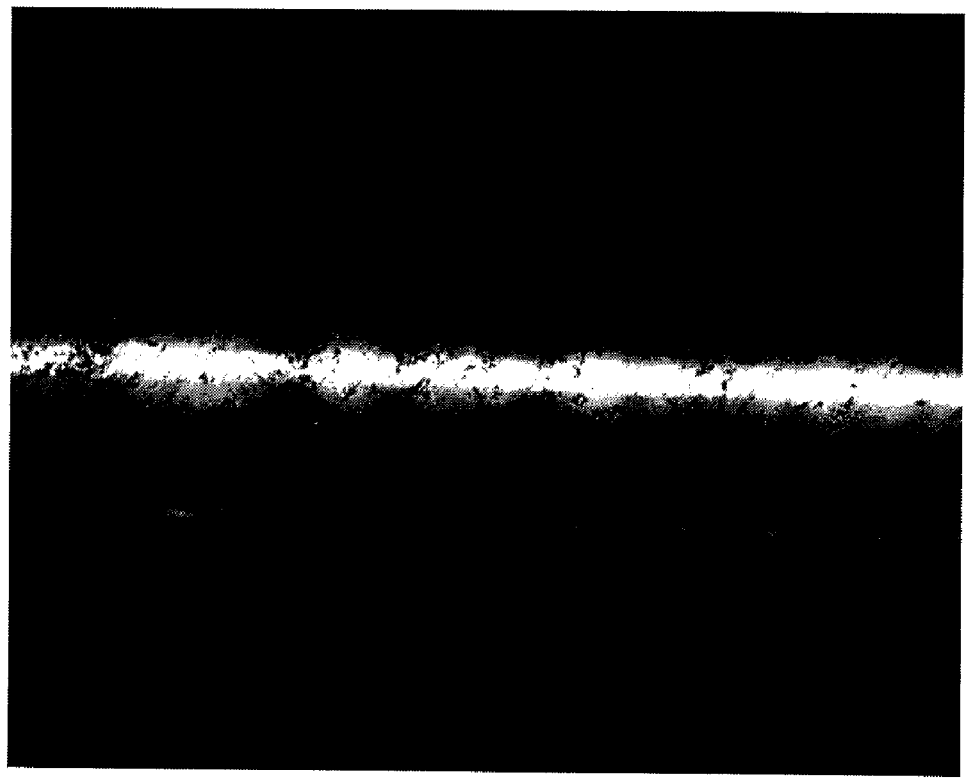
Figure 17C:
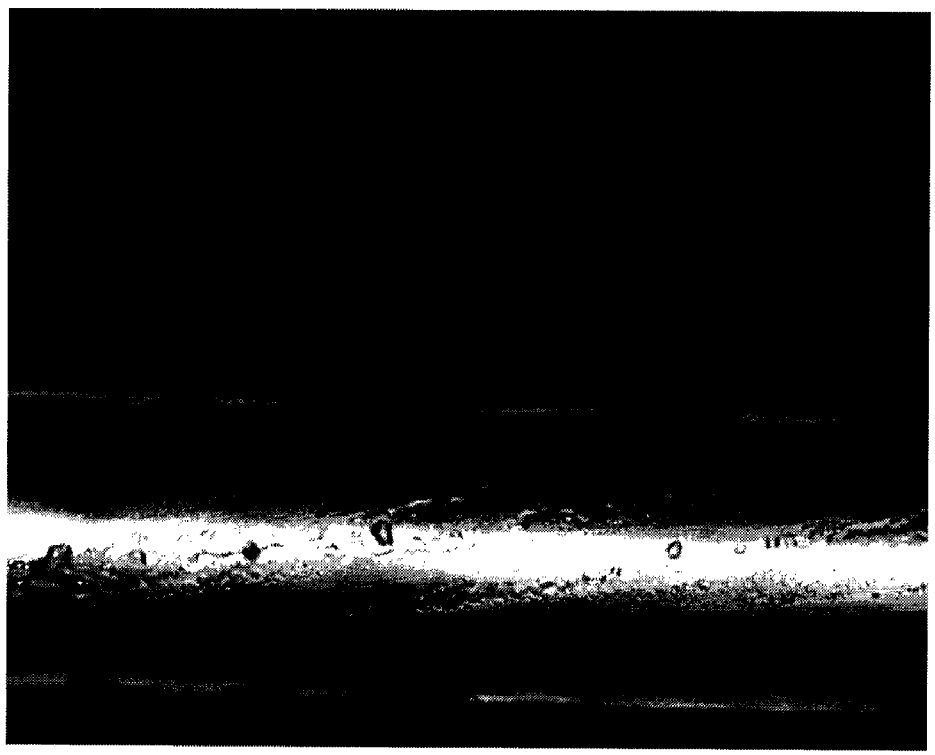
Figure 17D:
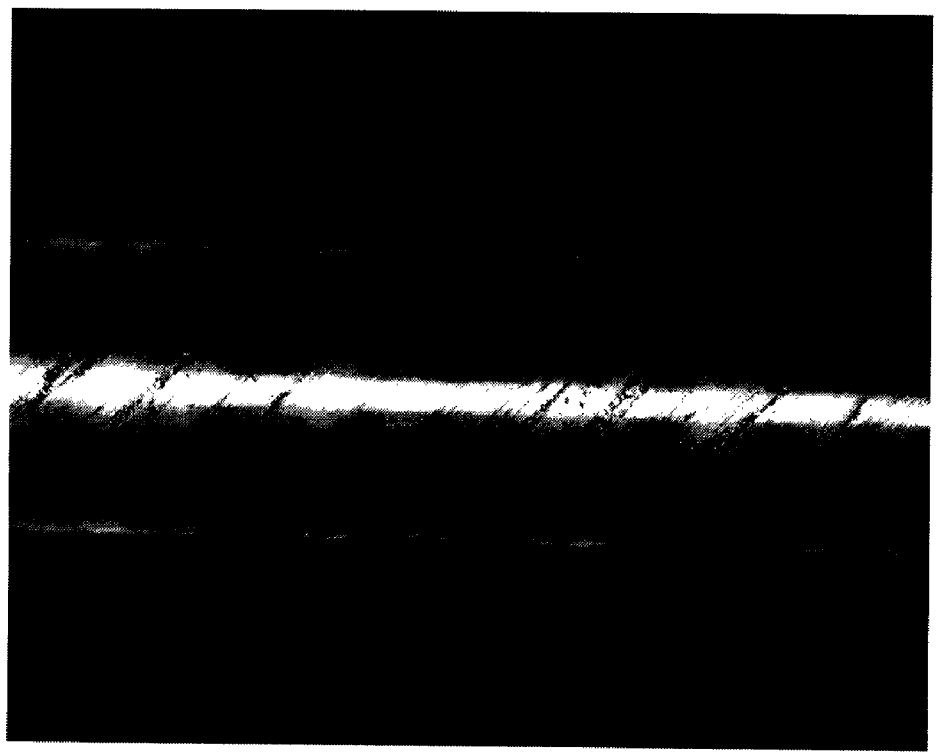

In a preferred embodiment of an optical coupler, at least a part of the outer surface of the optical coupler is covered by a soluble silicate, such as for example sodium silicate (also known as "water glass". For further details on soluble silicate, see e.g. James G. Vail, "Soluble silicates, their properties and uses", Vol. 1: Chemistry, (1952). For a commercial water glass, see e.g. Natron ""kvalitet S38, vatten 63-70%" from the company Natron Vattenglas, Sweden. FIG. 16 shows a photomicrograph of an outer surface of an optical coupler according to a preferred embodiment of the invention. The outer surface is covered by a water glass and serves as a mode stripper. The mode stripper is around 2 mm in length.

In a preferred embodiment, a method of producing an optical coupler comprising sodium silicate is provided.
1. applying water glass to at least a part of the outer surface of the coupler.
2. Letting the water glass dry. Typically drying is taking placing during a few seconds to minutes, but longer periods may also be used. Optionally, the drying is performed using forced air.
3. Wiping off part of the water glass to leave a non-smooth surface. The pictures 17 *a,b,c,* and *d* show results of the method for drying periods of 3, 5, 8, and 10 seconds, respectively. This result of the method is a surface comprising small flakes of water glass attached to the surface, acting as an optical scatterer.

Optionally, the method of producing an optical coupler comprising a water glass mode stripper comprises the steps of applying a thick layer of water glass; letting the water glass surface dry; heating the water glass such that the water glass bubbles or 'explodes'. The bubbled or 'exploded' surface improves the light scattering performance of the mode stripper and hence the power capacity of the optical coupler. FIG. 16 shows an example of a mode stripper made using a method, wherein water glass is made to 'explode'.

EXAMPLE 6

19X1 Pump Combiner with Air Cladding

Figure 18:
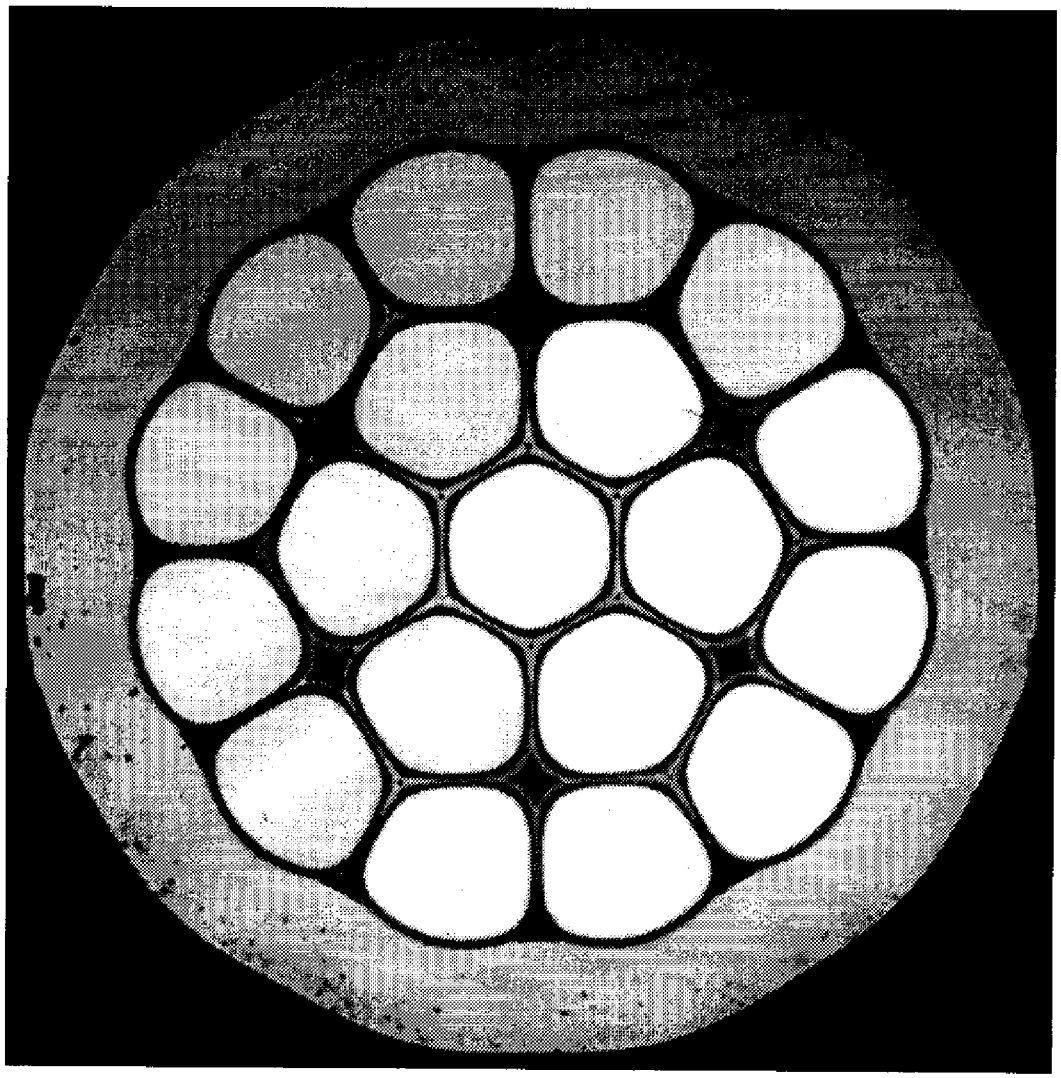
FIG. 18 shows an example of a fused bundle comprising 19 MM fibers.

In another example, a 19 to 1 pump combiner is presented.
A sample photograph of a 19 fused fiber bundle can be seen in FIG. 18.

Figure 19:
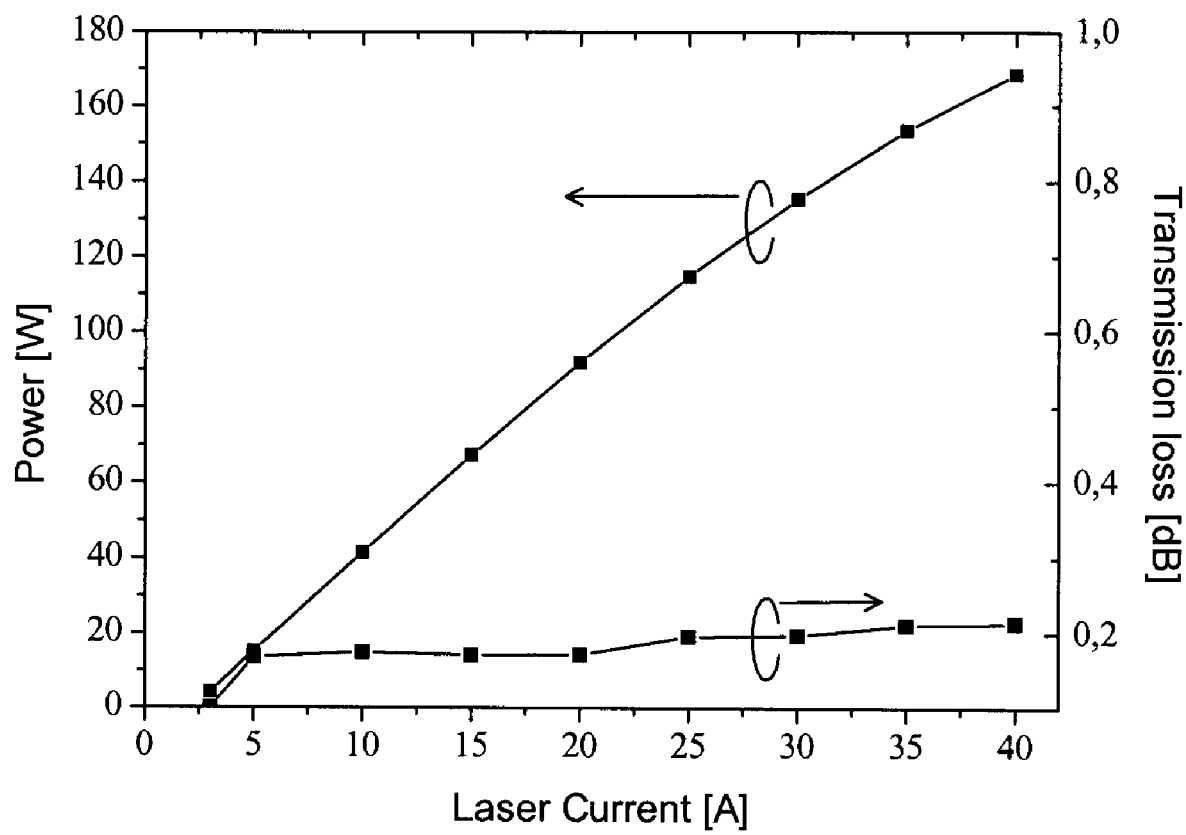
FIG. 19 shows a graph of transmitted power and transmission loss for a 19X1 combiner.

In this case, the delivery fiber has an inner cladding diameter of 240 µm, and the combined light has an NA of 0.50. As an initial test of the transmission properties of this combiner, 10 diode lasers from JENOPTIK Unique-Mode GmbH were spliced to 10 randomly chosen input ports (splice loss: ~0.1 dB). As can be seen in FIG. 19, the transmission loss through the combiner is 0.2 dB, corresponding to ~95% transmission efficiency.

Figure 20:
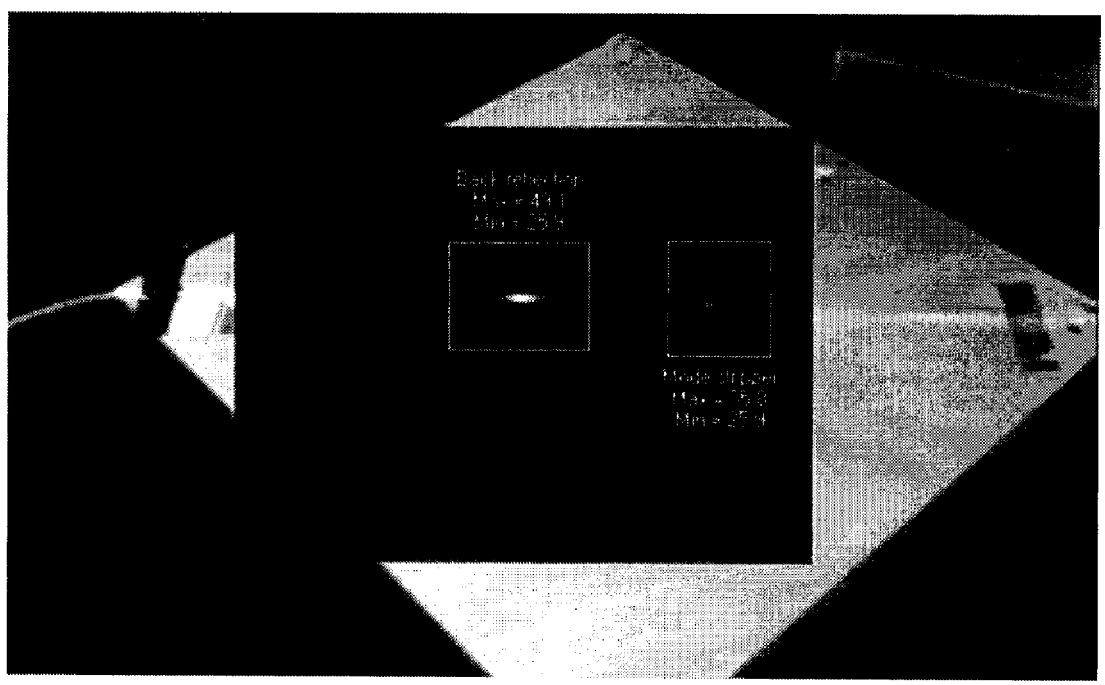

The slight increase in transmission loss at high laser currents is believed to be due to a slight increase in NA of the light emitted from the pump diode lasers. This increase in NA out of the diode laser has been confirmed in a separate measurement. Thermal images were made to measure if any substantial heating was taking place. Such image can be seen in FIG. 20.

As can be seen in the thermal image, the maximum temperature rise was ~25° C. above room temperature. Note that for this device, no active cooling was used. The hottest place (left) was at the fusing point where the 19 fibers meet and are fused together. The heating is believed to be caused by absorbed back-reflected light from the cleaved output facet. This back-reflected light will not be there when the combiner is spliced onto a laser fiber. In the second box (right), the temperature of the region around the mode-stripper region can be seen. Here, the temperature rises to ~15° C. above room temperature, showing the efficient operation of the mode-stripper.

First results from tests show stable operation at power levels reaching above 310 W under un-cooled conditions.

In the preferred embodiments of the present invention, 100 or more single-emitter diode pumps, delivered in 100 μm core multimode fibers with an NA of around 0.12 to 0.22, such as around 0.12 or around 0.15, are combined. Preferably, more than 36, such as more than 60, such as more than 90 pump delivery fibers are combined.

It may be desired to combine such a large number of pumps into the smallest possible air-clad pump guide with an NA corresponding to acceptable cleaving properties at that dimension.

FURTHER EXAMPLES

>19X1 Pump Combiner

In other examples of preferred embodiments of the present invention, pump combiners with more than 19 pump delivery fibers are presented. As reference, a 19x1 pump combiner as outline in a previous example will be used.

The below outlined parameters and assumptions may be used for exemplary reasons:

The diodes pigtails have a 100 μm core and not 105 μm as presently used on JDSU L3 diodes. Alternatively, if the cores should be around 105 μm, every dimension should just be scaled up accordingly, i.e. by 5% in the following examples.

The NA of the pump light into the combiner is 0.12 using a 5% intensity definition. In the case where the diodes have a higher NA, the input fiber on the combiner could be made only to support 0.12 and thereby filter out higher NA components in a splice.

It is possible to use pump port input fibers with reduced cladding diameter instead of the 125 μm standard. The input fiber used on the 19:1 combiner (with 100 μm core) has a cladding diameter of 118 μm and a coating diameter of 200 μm. A similar fiber is assumed here. Alternatively, the supported NA is decreased.

Preferably, a taper element has an F-doped ring as inner part of an air-clad. The ratio of the inner diameter of the F-doped ring to that of the air-clad is for example 0.97.

Both air-clad taper element and delivery fibers may have an outer diameter to inner cladding diameter ratio of 1.67

A method of producing a combiner comprises the following steps:

A step where all ~100 fibers are fused together in a tube forming a bundle

A step where the bundle is spliced to an air-clad taper element

Figure 21:
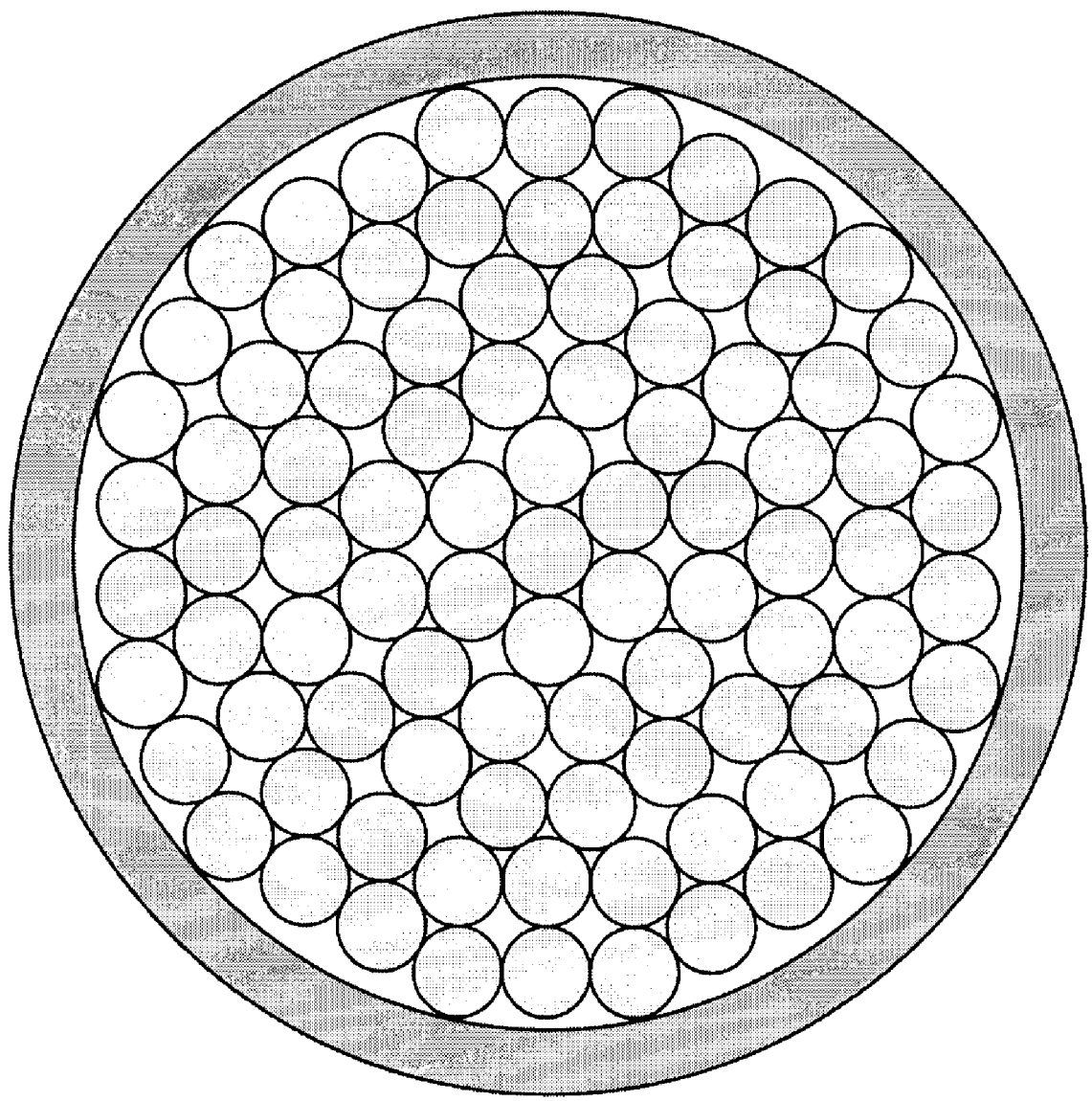
FIG. 21 shows a schematic drawing of 91 fibers close packed in a smallest possible round tube.

A step there the air-clad element is tapered down, cleaved, and spliced to a suitable delivery fiber Regarding an appropriate number of pump ports, the present experience is that even a large number of fibers can be arranged in an ordered manner if the tubes used for fusing have appropriate diameters and are perfectly circular. Because the fiber bundle is not truncated by a hexagonal tube, the lowest air-filling fraction is not obtained by a simple triangular arrangement of the fibers. However, there are still certain fiber counts that are preferred to fill out a round tube best. These fiber counts are the numbers 7, 19, 37, 61, and 91. The densest arrangement of 91 fibers within a circular boundary is shown in FIG. 21 and is a mixture of a triangular and rectangular lattice.

Figure 22:
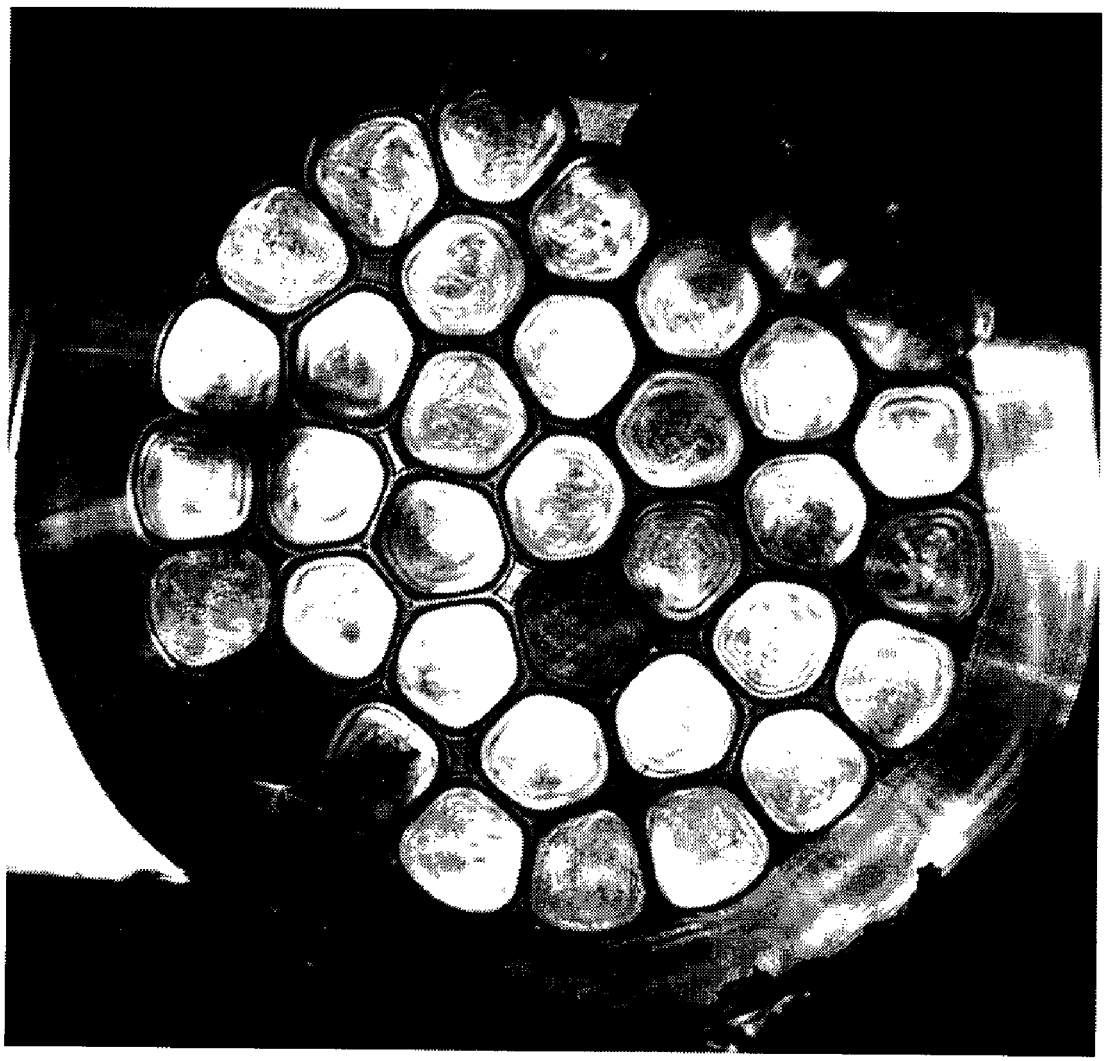
FIG. 22 shows a cross sectional image of a fused fiber bundles with 37 fibers close packed in a round tube.

In FIG. 22, fused bundles of 37 fibers are shown. As can be seen, the structure of these bundles is the same as sketched in FIG. 1. For the bundle of 37 fibers the fuse tube was slightly too big allowing the fibers to move from their ideal position.

In preferred embodiments, the number of pump fibers is chosen to be 91. Numbers such as 100 are possible but result in a higher brightness loss because the bundle will be less circular. If a bundle of 100 fibers were to be made circular by heavy fusing, some fibers in the bundle will be much more deformed than in the case of 91 fibers. Such deformation of pump fibers can in turn lead to increase in the NA and thereby also loss of brightness.

After having prepared the bundle of fibers, this should be spliced to the air-clad taper element. Since high fiber counts lead to thick fiber bundles, the taper element needs to be thick. The combination of air-clad fibers and large dimensions might lead to problems with cleaving properties. To overcome this problem, a taper element that can guide 0.22NA with collapsed air-clad has been developed. This is achieved by placing an F-doped ring inside the inner cladding close to the ring of air holes. Prior to cleaving, the taper element is collapsed forming a solid fiber and thereby eliminating the cleaving problems imposed by the airclad. When the air-clad element is tapered down and the NA of the light increase the light is caught and guided by the air cladding.

Figure 23:
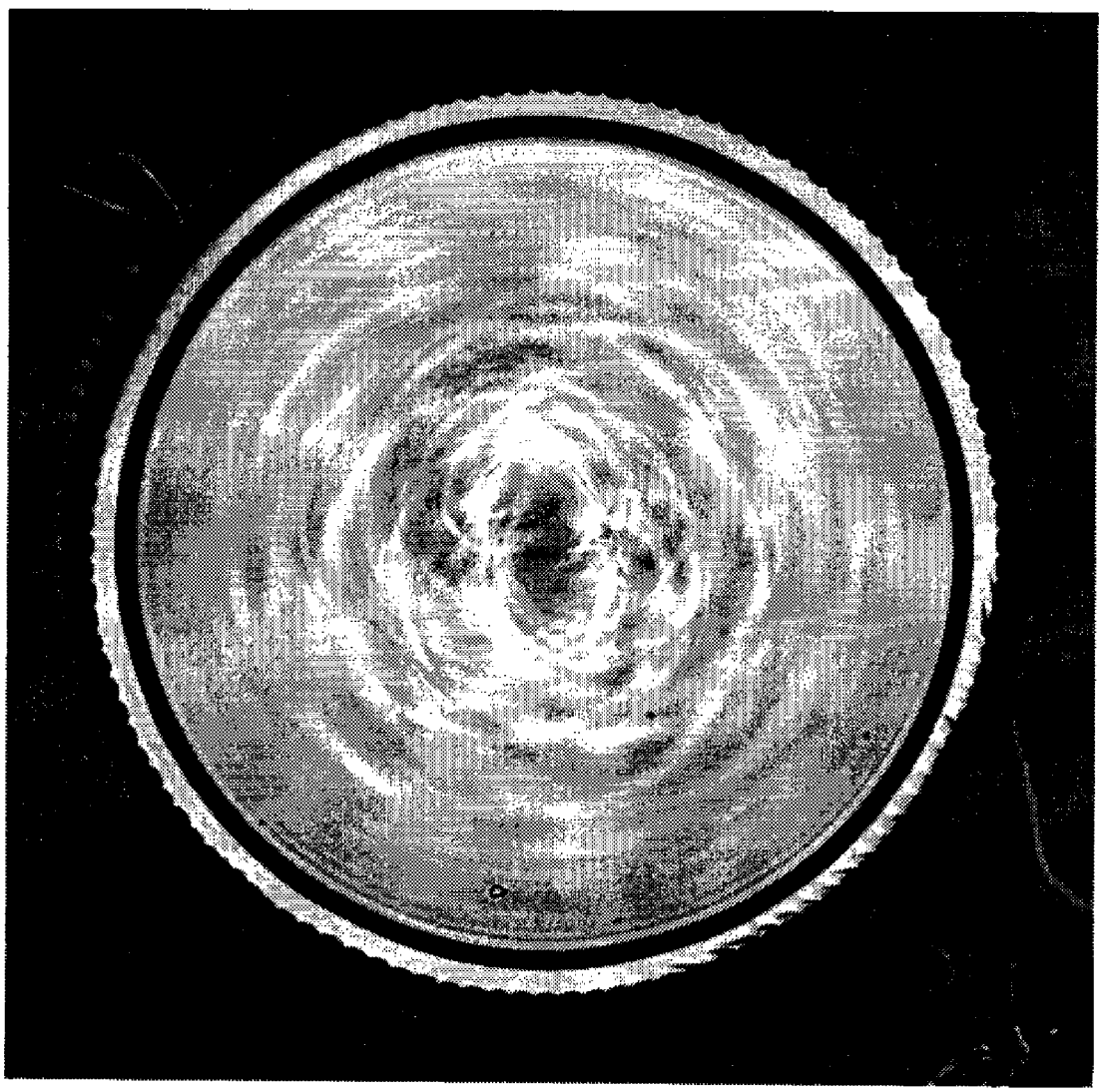
FIG. 23 shows a taper element with F-doped 0.22NA ring.

In FIG. 23 is shown the present taper element used for a 19:1 pump combiner. Two dark rings can be seen in the image. The outer ring with the slightly rippled edges is the airclad while the inner dark ring is the F-doped ring.

Figure 24:
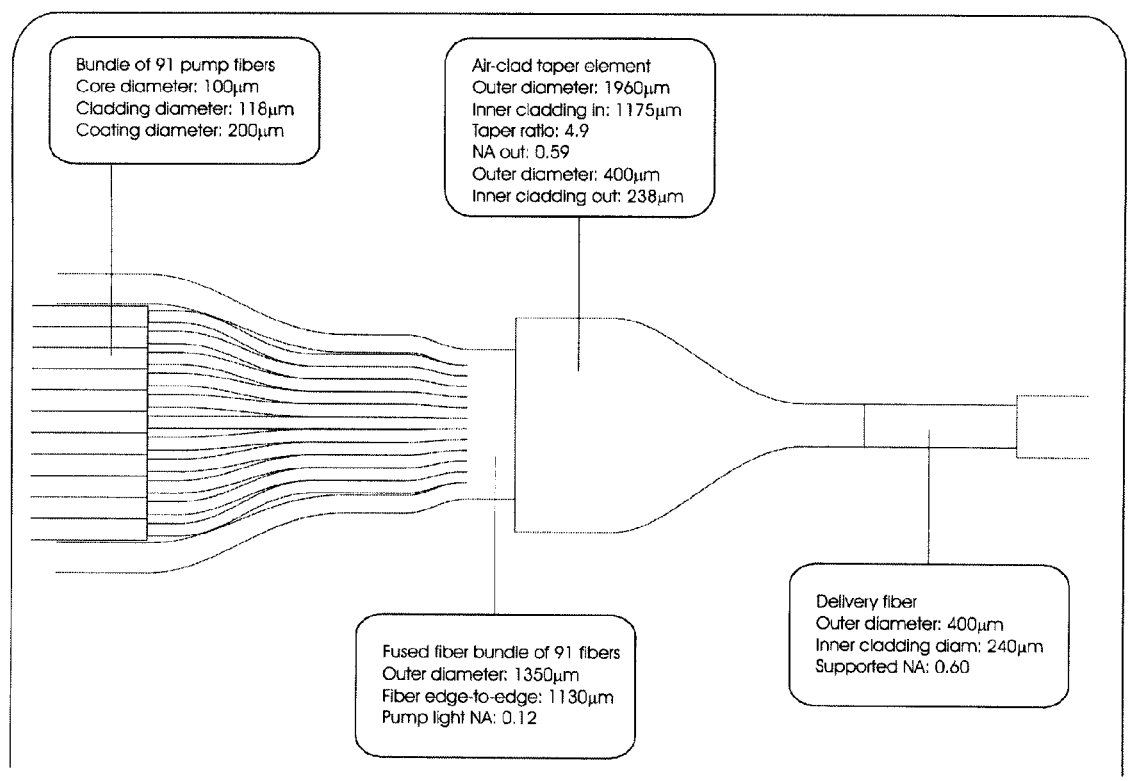
FIG. 24 shows a schematic example of a coupler according to a preferred embodiment of the present invention.

An example of a 91:1 combiner according to a preferred embodiment of the present invention is schematically shown in FIG. 24. Exemplary dimensions are listed in the figure. Using 10W single emitters where the tails of the far field is truncated to obtain 0.12 NA might leave in the order of 9W dependent on the exact far field distribution. From 91 ports this equals to a total power of 819W coupled into the delivery fiber (disregarding transmission loss). Neglecting transmission loss, the brightness in the delivery fiber compared to the total available brightness in the 91 inputs ports is 63%.

Figure 25:
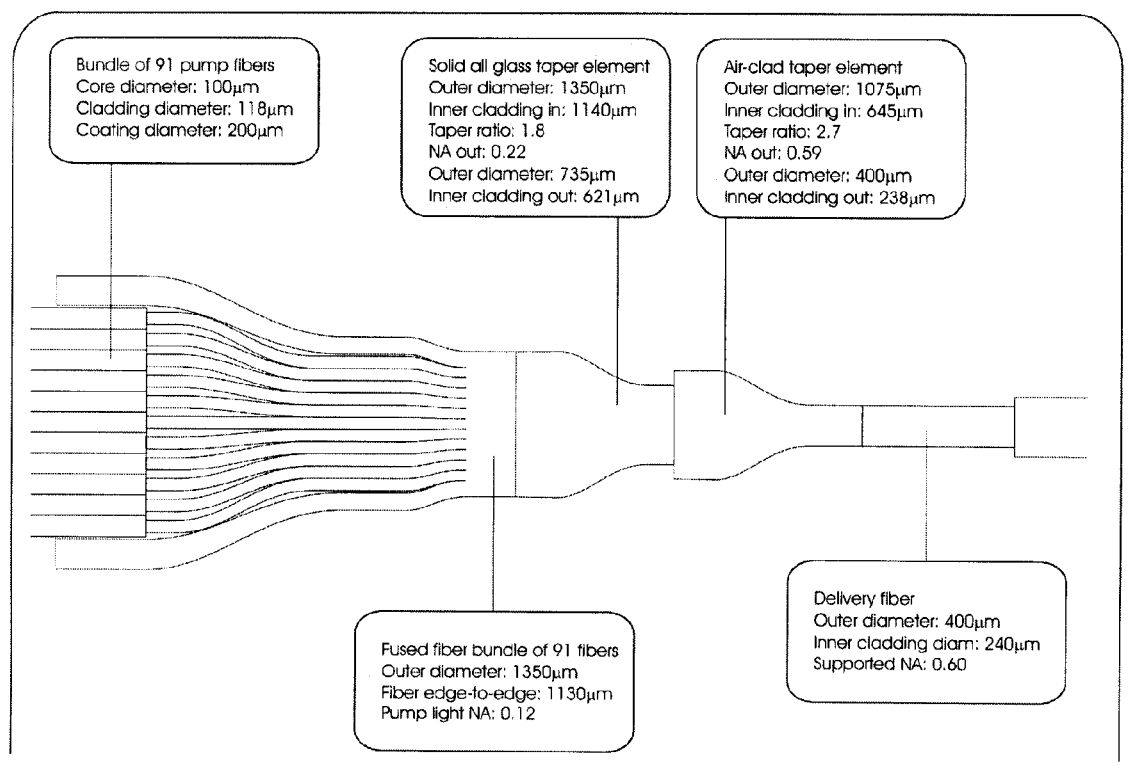
FIG. 25 shows another schematic example of a coupler according to a preferred embodiment of the present invention.

Another example of a 91:1 combiner according to a preferred embodiment of the present invention is schematically shown in FIG. 25. Examplary dimensions are listed in the figure. In this embodiment, the combiner comprises a solid pre-taper. The solid pre-taper allows a smaller area and higher NA already at the input of the PCF taper element allowing for smaller dimensions. This is in comparison with the previous example, where the air-clad taper at the input supports an NA of 0.12. This is done by a inserting a solid all-glass pre-taper between the fused bundle and the air-clad taper element. The purpose of this element is to increases the NA from 0.12 to 0.22. The solid pre taper is preferably a conventional multimode fiber with 0.22 NA. In the present example, the outer diameter of the taper element is 1075 μm. Compared to the previous example, an extra splice has been included that makes the combiner slightly more complicated and longer. However, this is considered to be of minor concern. Generally, splicing can be performed using commercial equipment, such as available from Vytran (e.g. using 'GPX-3500'). Preferably, the diodes have 0.12NA and the pump fibers support up to around 0.22 NA. The pre-tapering is performed directly on the bundle while still confining the light in the individual 91 cores. Alternatively, the diodes have >0.12 NA. Direct tapering of the bundle is still preferred. This can be achieved by splicing a length of 0.12NA intermediate fiber in between the pump diode pigtail (to truncate the NA) and the 0.22NA pump fiber which can then be tapered directly. The point is that the fibers to be tapered support 0.22 NA while the light is only 0.12NA. The brightness relative to the input is in this example also 63%.

Figure 26:
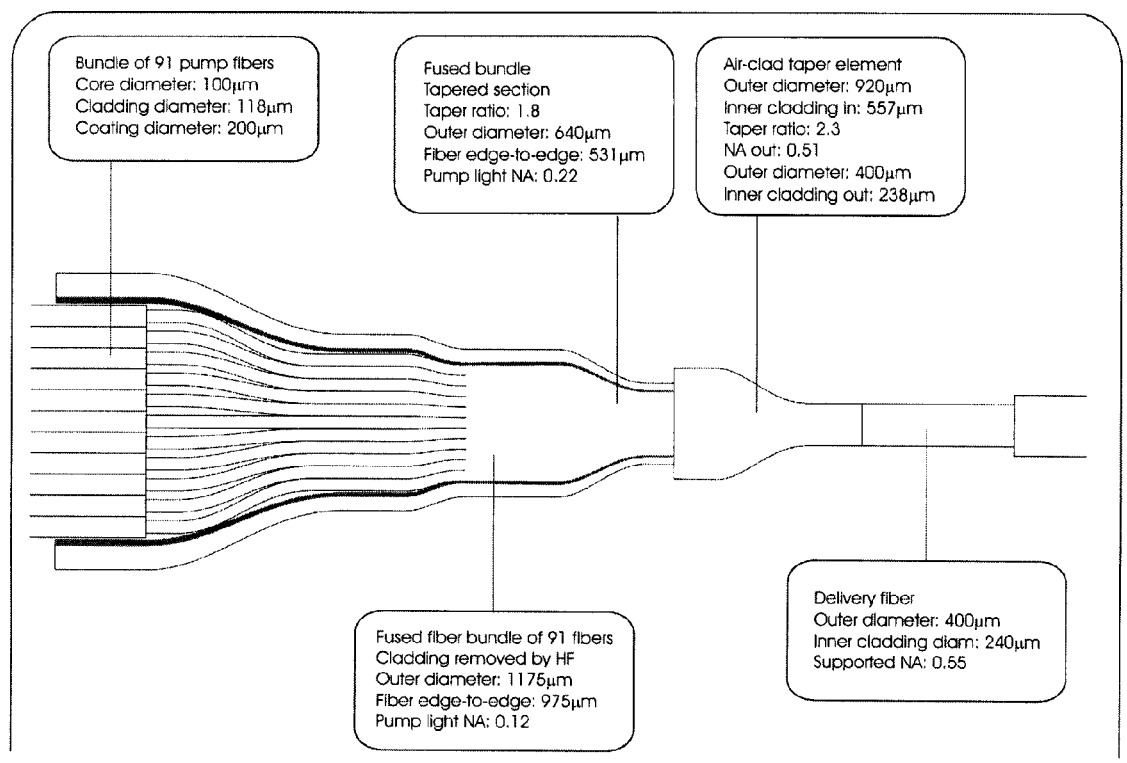
FIG. 26 shows yet another schematic example of a coupler according to a preferred embodiment of the present invention.

Yet another example of a 91:1 combiner according to a preferred embodiment of the present invention is schematically shown in FIG. 26. Exemplary dimensions are listed in the figure. In this embodiment, the combiner has been produced by a method that comprises the step of etching at least a part of a cladding. This allows increase of the brightness relative to the input beyond 63%. The present inventors have realized that it is important to eliminate the area that is introduced by the cladding glass on each of the 91 pump fibers. In the present example, the cladding layer is removed by chemical etching while still avoiding guiding the light using glass-air interfaces. Preferably, a tube used to fuse the etched fibers has an inner layer which is F-doped to an index contrast (relative to silica) corresponding to 0.22NA. When the cladding etched fibers are fused in this tube the light will be guided within this F-doped ring forming a single core without loss of brightness. In this example the core has a diameter of around 975 μm. Preferably, the combiner comprises a solid pre-taper (as described in the previous example). The bundle is pre-tapered to increase the NA from 0.12 to 0.22. As an example, at 9W per port, the brightness coupled into the delivery fiber corresponds to 425W in a 400 μm 0.22NA fiber. Compared to the brightness on the input side the brightness in the delivery fiber is 87%. Removing the F-doped ring in the taper element may raise this number to beyond 90%, such as 92%.

Some preferred embodiments have been shown in the foregoing, but it should be stressed that the invention is not limited to these, but may be embodied in other ways within the subject-matter defined in the following claim.

REFERENCES

U.S. Pat. No. 5,864,644 (LUCENT TECHNOLOGIES INC) Jan. 26, 1999
U.S. Pat. No. 6,778,562 B (ALCATEL) Aug. 17, 2004
WO 2005/091029 A (CRYSTAL FIBER A/S) Sep. 29, 2005
U.S. Pat. No. 5,907,652 (LUCENT TECHNOLOGIES INC) May 25, 1999
WO 03/019257 A (CRYSTAL FIBER A/S) Mar. 06, 2003
WO 00/49435 A (UNIV BATH) Aug. 24, 2000
T. A. BIRKS, P. ST. J. RUSSELL, C. N. PANNELL. Low Power Acousto-Optic Device Based on a tapered Single-Mode Fiber. IEEE Photonics Technology Letters. June 1994, vol. 6, no. 6, p. 725-727.
BJARKLEV, Anders, et al. Photonic Crystal Fibers. Kluwer Academic Press, 2003. p. 115-130.
WO 02/101429 A (CRYSTAL FIBER A/S) Dec. 19, 2002
WO 02/088802 A (BLAZEPHOTONICS LTD) Nov. 07, 2002

The invention claimed is:

1. An optical coupler for coupling light from at least two input fibers into one output fiber,
the optical coupler comprising
a) an input section comprising at least two input fibers, which are bundled over a bundling-length and having an output end face at one end of the bundling-length; and
b) an output section having an input end face, said output section further comprising an output fiber comprising a confining region for confining light propagated in said input fibers and a surrounding low index cladding region comprising down-doped silica;
wherein said output end face of said input section is optically coupled to said input end face of said output section, the output fiber comprises an air-cladding for confining light surrounding said confining region at least over part of its longitudinal extension, and at least said confining region of said output fiber is tapered down from a first cross sectional area at said input end face to a second, smaller cross sectional area over a tapering-length of said output fiber.

2. The optical coupler according to claim 1 wherein said input section comprises an input fiber enclosure with a longitudinal extension, which encloses said input fibers at least over a part of said bundling-length.

3. The optical coupler according to claim 2 wherein said input fiber enclosure has an end face forming part of said output end face of said input section.

4. The optical coupler according to claim 1 wherein the input section comprises a first input sub-section comprising first lengths of said at least two input fibers and a second input sub-section comprising second lengths of said at least two input fibers, which are bundled over said bundling-length.

5. The optical coupler according to claim 1 wherein the output fiber is a non-micro-structured optical fiber.

6. The optical coupler according to claim 1 wherein the output fiber is a micro-structured optical fiber.

7. The optical coupler according to claim 6 comprising solid micro-structured elements, at least over a length including said input end face.

8. The optical coupler according to claim 1 wherein the output fiber comprises a low-index cladding region surrounding said confining region.

9. The optical coupler according to claim 8 wherein said air-cladding region surrounds said low-index cladding region.

10. The optical coupler according to claim 1 wherein each of the at least two input fibers comprise a core region for propagating light at a wavelength ëand a surrounding cladding region, wherein said input fiber core regions are adapted for carrying light for being optically coupled to said confining region of said output fiber.

11. The optical coupler according to claim 10 wherein said core regions of said input fibers at said output face of said input section are aligned with said confining region of said output fiber at said input face of said output section to minimize optical loss at their interface.

12. The optical coupler according to claim 1 wherein the cross-sectional form and dimensions of a curve enclosing the outer boundary of the input fiber bundle at the output end face of the input section and the cross-sectional form and dimensions of the confining region of the output fiber at the input end face are adapted to minimize loss in the optical coupling between the input section and the output section.

13. The optical coupler according to claim 1 wherein the input fiber bundle comprises one or more standard, non-micro-structured, optical fibers.

14. The optical coupler according to claim 1 wherein at least one of the input fibers is a multimode fiber.

15. The optical coupler according to claim 14 wherein all of the input fibers are multimode fibers.

16. The optical coupler according to claim 1 wherein the at least two input fibers comprise a signal fiber, which is adapted to guide light at a signal wavelength and one or more pump fibers adapted to guide light at a pump wavelength.

17. The optical coupler according to claim 1 wherein at least one of the input fibers is a micro-structured fiber.

18. The optical coupler according to claim 17 wherein one of said micro-structured fibers is centrally located.

19. The optical coupler according to claim 1 wherein the output fiber comprises a region that is multimode at a wavelength propagated by the optical coupler.

20. The optical coupler according to claim 1 wherein the output fiber is a multi-clad fiber.

21. The optical coupler according to claim 1 wherein the output fiber comprises a signal core adapted to guide light at a signal wavelength and a first cladding region adapted to guide pump light at a pump wavelength.

22. The optical coupler according to claim 21 wherein the input section and the output section are adapted to provide that signal light from the input signal fiber is propagated in the signal core of the output fiber.

23. The optical coupler according to claim 2 wherein the input fiber enclosure is a glass tube.

24. The optical coupler according to claim 2 wherein the input fiber enclosure has a length of at least 1 mm.

25. The optical coupler according to claim 1 wherein the tapering length of the output fiber is at least 1 mm.

26. The optical coupler according to claim 1 wherein the input fibers are fused together over a fusing length of their longitudinal extension comprising at least a part of the bundling-length including said output end face of said input section.

27. The optical coupler according to claim 26 wherein said fusing length is smaller than the said bundling-length.

28. The optical coupler according to claim 26 wherein said input section comprises an input fiber enclosure with a longitudinal extension, which encloses said input fibers at least over a part of said bundling-length and wherein said fusing length is smaller than the length of said enclosure.

29. The optical coupler according to claim 2 wherein the at least two input fibers and the input fiber enclosure are fused together over at least a part the length of said enclosure including said output end face of said input section.

30. The optical coupler according to claim 1 wherein the outer geometries of the input and output sections are adapted to substantially match each other at their common interface.

31. The optical coupler according to claim 1 wherein the output section consists of said output fiber.

32. The optical coupler according to claim 1 wherein at least one of the input fibers is un-coated over at least a part of the bundling-length.

33. The optical coupler according to claim 2 wherein at least one of the input fibers, is un-coated over at least a part of the longitudinal extension of said enclosure.

34. The optical coupler according to claim 1 comprising a mechanically protective sleeve at least over a part its length and at least covering the mutually optically coupled end faces of the input and output sections.

35. A method of fabricating the optical coupler of claim 1 for coupling light from at least two input fibers into one output fiber, comprising:
 a) providing lengths of said at least two input fibers;
 b) providing that said at least two input fibers are bundled over a bundling-length-part of their length, and having an output end face at one end of the bundling-length, and forming part of an input section;
 c) providing an output section comprising an output fiber comprising a confining region for confining light propagated in said input fibers and a surrounding cladding region comprising an air-cladding and having an input end face;
 d) providing that said output end face of said input section is optically coupled to said input end face of said output section; and
 f) providing that at least said confining region of said output fiber is tapered down from a first cross sectional area at said input end face to a second, smaller cross sectional area over a tapering-length of said output fiber.

36. A method according to claim 35 wherein said input section is provided with an input fiber enclosure with a longitudinal extension, which encloses said input fibers at least over a part of said bundling-length.

37. A method according to claim 36 wherein said input fiber enclosure is provided with an end face forming part of said output end face of said input section.

38. A method according to claim 35 providing that the output fiber comprises a low-index cladding region surrounding said confining region.

39. A method according to claim 38 providing that said low-index cladding region comprises Fluor.

40. A method according to claim 38 providing that said low-index cladding region comprises a polymer.

41. A method according to claim 38 providing that said low-index cladding is applied to the output fiber after the tapering of the confining region.

42. A method according to claim 38 providing that said air cladding surrounds said low-index cladding region.

43. A method according to claim 35 providing that each of the at least two input fibers comprise a core region for propagating light at a wavelength ëand a cladding region.

44. A method according to claim 43 wherein said core regions of said input fibers at said output face of said input section are aligned with said confining region of said output fiber at said input face of said output section to minimize optical loss at their interface.

45. A method according to claim 35 providing that the input fibers are fused together over a fusing length of their longitudinal extension comprising at least a part of the bundling-length.

46. A method according to claim 36 providing that the input fiber bundle and the input fiber enclosure are fused together over at least a part of the length of said enclosure including said output end face of said input section.

47. A method according to claim 35 providing that the bundled and optionally enclosed input fibers are cleaved to form the output end face of said input section.

48. A method according to claim 35 providing that said output fiber is made by a stack and draw or an extrusion method.

49. A method according to claim 35 providing that said end faces of said input and output sections are adapted to provide a relatively low loss optical coupling between the input and output sections.

50. A method according to claim 35 providing that said end faces of said input and output sections are substantially plane.

51. A method according to claim 35 providing that the outer geometries of the in put and output sections are adapted to substantially match each other.

52. A method according to claim 35 wherein the input section is spliced to the output section.

53. A method according to claim 52 wherein the input section is fusion spliced to the output section.

54. An article comprising an optical coupler according to claim 1.

55. An article according to claim 54 in the form of a laser or an optical amplifier.

56. An optical coupler according to claim 8 wherein said low-index cladding region comprises Fluor.

57. An optical coupler according to claim 8 wherein said low-index cladding region comprises a polymer.

* * * * *

UNITED STATES PATENT AND TRADEMARK OFFICE
Certificate

Patent No. 7,532,792 B2                                                                       Patented: May 12, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peter M. W. Skovgaard, Birkerød (DK); Martin Dybendal Nielsen, Kgs. Lyngby (DK); and Mads Hoy Sorensen, Frederiksberg (DK).

Signed and Sealed this First Day of December 2009.

UYEN-CHAU N. LE
*Supervisory Patent Examiner*
Art Unit 2874